United States Patent [19]
Passaniti et al.

[11] Patent Number: 6,010,802
[45] Date of Patent: Jan. 4, 2000

[54] CURRENT COLLECTOR ASSEMBLY

[75] Inventors: Joseph L. Passaniti, Madison; Gregory J. Davidson, Oregon; Kenneth H. Kenyon, Verona, all of Wis.

[73] Assignee: Rayovac Corporation, Madison, Wis.

[21] Appl. No.: 08/589,610

[22] Filed: Jan. 22, 1996

[51] Int. Cl.[7] .................................................. H01M 2/06
[52] U.S. Cl. ........................ 429/172; 429/174; 429/181
[58] Field of Search .................................... 429/164, 165, 429/170, 171, 172, 173, 174, 181, 185; 411/531, 533, 537, 539, 545

[56] References Cited

U.S. PATENT DOCUMENTS

| | | |
|---|---|---|
| 3,042,734 | 7/1962 | Carmichael et al. . |
| 3,314,824 | 4/1967 | Spanur . |
| 3,588,787 | 6/1971 | Kindell et al. . |
| 3,617,386 | 11/1971 | Bosben et al. . |
| 3,663,301 | 5/1972 | Ralston et al. . |
| 3,740,271 | 6/1973 | Jammet et al. . |
| 3,764,392 | 10/1973 | Kuwazaki et al. . |
| 3,954,505 | 5/1976 | Anderson . |
| 4,075,398 | 2/1978 | Levy . |
| 4,191,806 | 3/1980 | Levy . |
| 4,227,701 | 10/1980 | Tsuchida et al. . |
| 4,476,200 | 10/1984 | Markin et al. . |
| 4,518,282 | 5/1985 | Wilcox et al. ........................ 411/531 X |
| 4,537,841 | 8/1985 | Wiacek et al. . |
| 4,670,362 | 6/1987 | Wiacek et al. . |
| 4,708,559 | 11/1987 | Locotos ............................... 411/531 X |
| 4,999,264 | 3/1991 | Shepard, Jr. et al. ................... 429/171 |
| 5,008,161 | 4/1991 | Johnston . |
| 5,015,542 | 5/1991 | Chaney et al. . |
| 5,051,323 | 9/1991 | Murphy . |
| 5,080,985 | 1/1992 | Wiacek et al. .......................... 429/172 |
| 5,173,379 | 12/1992 | Ichinose et al. ........................ 429/174 |
| 5,248,568 | 9/1993 | Getz . |
| 5,277,261 | 1/1994 | Georgopoulos . |
| 5,292,209 | 3/1994 | Calandra et al. .................... 411/545 X |
| 5,422,201 | 6/1995 | Georgopoulos . |
| 5,532,081 | 7/1996 | DePalma et al. ........................ 429/171 |
| 5,607,796 | 3/1997 | Jacus et al. ............................. 429/165 |

FOREIGN PATENT DOCUMENTS

| | | |
|---|---|---|
| 0495392A2 | 7/1992 | European Pat. Off. . |
| 0538039A2 | 4/1993 | European Pat. Off. . |
| WO91/09429 | 6/1991 | WIPO . |
| WO92/04738 | 3/1992 | WIPO . |

*Primary Examiner*—Stephen Kalafut
*Attorney, Agent, or Firm*—Thomas D. Wilhelm; A. Nicholas Trausch, III

[57] ABSTRACT

Collector assemblies and methods of making and using them, and electrochemical cells made with such current collector assemblies, are disclosed. The invention provides a current collector assembly which permits safe, effective venting of pressure in the cell; reduces early activation of venting structures in the current collector assembly; contains fewer piece parts than known structurally-robust current collectors; is easy to implement; and provides superior tolerance to outside impact forces. Current collectors of the invention provide a stiffer, more rigid washer, repositioned closer to the bottom plate at its central region while the washer maintains the traditional function of controlling positioning of the seal body of the current collector assembly. Increasing stiffness, rigidity, and the repositioning of the washer is accomplished by a combination of structurally sculpturing the cross-section of the washer, hardening the temper of the washer, and providing a plateau adjacent the center of the bottom plate. Washer vent holes are relocated away from the central region, the bottom plate being most vulnerable to attack in the central region. Overall, the improved washer provides both support to the seal body against outwardly-directed internal pressures within the cell and support to the bottom plate against inwardly directed impact forces from outside the cell.

61 Claims, 18 Drawing Sheets

CURRENT COLLECTOR ASSEMBLY

FIELD OF THE INVENTION

This invention relates to primary and rechargeable electrochemical cells, such as cylindrical alkaline manganese dioxide cells, and methods of making and using such cells.

BACKGROUND OF THE INVENTION

Current collector assemblies for electrochemical cells have been used for many years. Current collectors for alkaline manganese dioxide electrochemical cells are well known. Numerous disclosures of such current collector assemblies have been made, including the following patents, all of which are hereby incorporated by reference in their respective entireties.

| Country | Patent No. | Inventor | Issue Date |
|---|---|---|---|
| U.S.A. | 3,042,734 | Carmichael et al. | 1960 |
| U.S.A. | 3,314,824 | Spanur | 1967 |
| U.S.A. | 3,617,386 | Bosben et al. | 1971 |
| U.S.A. | 3,663,301 | Ralston et al. | 1972 |
| U.S.A. | 3,740,271 | Jammet et al. | 1973 |
| U.S.A. | 3,764,392 | Kuwazaki et al. | 1969 |
| U.S.A. | 3,954,505 | Anderson | 1976 |
| U.S.A. | 4,075,398 | Levy | 1978 |
| U.S.A. | 4,191,806 | Levy | 1980 |
| U.S.A. | 4,227,701 | Tsuchida et al. | 1980 |
| U.S.A. | 4,476,200 | Markin et al. | 1984 |
| U.S.A. | 4,537,841 | Wiacek et al | 1985 |
| U.S.A. | 4,670,362 | Wiacek et al. | 1987 |
| U.S.A. | 5,008,161 | Johnston | 1991 |
| U.S.A. | 5,015,542 | Chaney et al. | 1991 |
| U.S.A. | 5,051,323 | Murphy et al. | 1991 |
| U.S.A. | 5,227,261 | Georgopoulos | 1993 |
| U.S.A. | 5,248,568 | Getz | 1993 |
| U.S.A. | 5,422,201 | Georgopoulos | 1995 |

U.S. patent application Ser. No. 08/407,391, filed Mar. 20, 1995 and entitled "Battery Sealing Cap," is also hereby incorporated by reference in its entirety.

The disclosure herein discusses the invention within the context of a cylindrical alkaline manganese dioxide cell. However, the invention is not limited to alkaline manganese dioxide cells. Rather, the invention can be practiced with a wide variety of cell structures, and incorporating a wide variety of combinations of electrochemical reactants well known in the art. Thus, the invention can be applied to carbon-zinc electrochemical cells, alkaline manganese dioxide cells, and lithium cells, as well as primary and rechargeable cells.

Cylindrical alkaline manganese dioxide electrochemical cells typically comprise a centrally disposed zinc anode surrounded by a plurality of ring shaped manganese dioxide cathode members. The anode and cathode are disposed within a metal container or can having an open top end. Electrical connection to the anode is generally effected by placing an elongated metal member, commonly referred to as a current collector or nail, within the zinc anode.

The nail may be forcibly driven through a resilient and electrically nonconductive seal body or gasket that forms a closure over the zinc anode material and manganese dioxide cathode material. Thus, the seal body effectively closes off the open top surfaces of the active electrochemical materials from the outside environment. The top end of the current collector protrudes above the seal body for physical and electrical connection to an electrically conductive metal bottom plate. A primary length of the elongated shank of the current collector is inserted into the zinc anode material. A small portion of the exterior surface of the shank of the current collector resides within the seal body, in sealing engagement therewith.

Prior to manufacturing a cylindrical alkaline manganese dioxide electrochemical cell, the current collector and seal body are usually preassembled to form a current collector subassembly.

The outer peripheral edge of the seal body, and the portion of the seal body surrounding the centrally located opening, are usually reinforced by thickening the seal body material at those locations. At least one portion of the seal body between the reinforced areas may be made thinner in cross-section to permit the seal body to rupture when internal pressure within the cell exceeds a predetermined limit.

The reinforced portion of the seal body that surrounds and defines the centrally located opening is commonly referred to as the "hub." When the current collector is inserted through the opening, there is preferably an interference fit, between the sidewalls defining the central opening of the hub, and the current collector because the diameter of the central opening is less than the diameter of the nail. An interference fit between the nail and the opening is required so that caustic electrolyte or other liquid chemicals in the cell cannot escape from the cell interior by creeping along the surface of the nail and through the central opening.

Depending on the particular design used in a given cell, and in addition to the two components of the current collector subassembly described above, the complete current collector assembly may additionally include a washer, a bottom plate, a gasket puncture plate a vent pressure control plate, a rivet, or any combination of the foregoing components.

Heretofore, the primary focus in designing improved current collector assemblies has been directed toward minimizing the tendency for the cells to leak electrolyte. This design goal has been addressed in numerous ways. Materials from which the seal body is fabricated have been strengthened. The current collector nails have been lubricated prior to insertion through the central opening. Tightness of the fit between the nail and the central opening, or between the outer peripheral edge of the seal body and the inner surface of the can, has been increased.

It is common for reactions taking place within an electrochemical cell to generate gases as product of such reactions. The generation of such gases causes well known increase in pressure within the cell, generally referred to as "internal pressure." Internal pressure within a cell using the current collector assembly 10 of FIG. 1(a) causes seal body 14 to deflect upwardly. The higher the pressure, the greater the deflection in the seal body.

While it is preferable to maintain all materials, including gases, sealed within the cell, in some environments, and in some individual cells, it is necessary to provide for release of internal cell pressure in preference to allowing the pressure to build up to the point where the crimp is opened up, dismembering the cell, or worse, the cell may explode or otherwise burst. Thus, in cell types which carry significant potential for bursting, the design typically provides for release of gases from the cell at a predetermined internal pressure. On the other hand, if the cell is generally open to the atmosphere, electrolyte can evaporate from the cell, causing the cell to dry out and become useless. Thus, while venting of the cell should be provided for, the cell should generally be closed to gaseous escape except when the predetermined internal pressure is reached.

In addition, the cell must be sufficiently rugged that it tolerates external impacts, especially impacts on its anode and cathode ends without deleterious effect on the integrity of the cell, or its operation. Specifically, the cell must withstand being dropped on either end without excessive denting of the cell body. In a test of particular interest, a flashlight having 2 or more cells therein is dropped on its tail end, causing the protruding cathode nubbin of the trailing cell to impact against the center of the bottom plate of the anode assembly of the cell at the lens-end of the flashlight. Desirably, the cell is sufficiently robust, structurally, that the bottom plate of the anode end is not appreciably damaged in such test. In addition, the cell should be able to withstand being dropped on the anode assembly without significant damage to the anode end, or otherwise to the cell.

The combined requirements that the cell not leak electrolyte, that the cell properly vent excess pressure within the cell, and that the cell be sufficiently robust to withstand significant external impacts, tend to compete with each other. The leak-tightness and robust structural requirements demand a strong cell structure. The requirement for venting gas demands that at least some part of that robust structure develop a gaseous leak under certain conditions.

As discussed hereinafter, cells known to the inventors tend to fall into one of two classes. In the first class, the cells are sufficiently robust that they withstand the above-described impact testing. They generally do not leak electrolyte. And they generally vent internal pressure as required. However, such cells have a relatively large number of piece parts and thus carry an undesirably high cost of production.

In the second class, the cells generally do not leak electrolyte unless they are subjected to significant external impacts at the anode end. However, upon such external impacting, the central region of the bottom plate of the cell is significantly dented, with subsequent leakage of electrolyte being common. In addition, the external impact commonly activates the venting of the cell, independent of the internal pressure, within the cell.

Thus, there remains a practical requirement for a cell having the desired combination of high strength at the anode end of the cell, tightness against leakage of electrolyte, a generally effective gaseous seal, along with proper venting, all at an economic cost, preferably using a minimum number of pieces.

SUMMARY OF THE INVENTION

It is an object of this invention to provide an improved structurally robust electrochemical cell wherein the bottom plate at the anode end of the cell has excellent tolerance for, and resistance against, impact forces directed against the outer surface of the bottom plate.

It is another object to provide improved cells wherein the cell reliably vents at predetermined pressures.

It is still another object to provide such robust cells, and cells which reliably vent, which cells use a desirably small number of piece parts in the anode current collector assembly, which assemblies are easily assembled, and which enjoy corresponding cost advantages.

Other objects, features, and advantages of the invention will become apparent from the detailed description of the invention.

The current collector assemblies and methods of the invention solve certain problems. That is, the invention provides solutions to problems existing in the prior art. For example, the invention provides a current collector assembly which (a) permits safe and effective venting of pressure which can build up in the cell; (b) contains fewer piece parts than known structurally robust current collectors, and is therefore less expensive than prior art current collector assemblies; (c) prevents or minimizes early activation of venting structures built into the current collector assembly; (d) is easy to implement; and (e) provides superior tolerance to impact forces imposed on the outer surface of the bottom plate of the cell.

In its most basic embodiment, the current collector and method of the invention provide a stiffer, more rigid washer, repositioned closer to the bottom plate at the central region of the bottom plate. Increasing stiffness, rigidity, and the repositioning of the washer is accomplished by a combination of structurally sculpturing the cross-section of the washer to achieve an I-beam affect, hardening the temper of the washer, and providing a sculptured plateau adjacent the center of the bottom plate. In addition, vent holes in the washer are moved outwardly, away from the central region where the bottom plate is most vulnerable to attack, thus providing maximum strengthening material in the region where it is most needed for structural support.

The current collector assembly of the present invention has three preferred features: (a) a seal body having a central hub, an outer member extending outwardly away from the hub, and a vent panel between the hub and the outer member; (b) an electrically conductive current collector extending through an aperture in the hub, and electrically and physically mounted to a bottom plate which closes the cell; and (c) an improved, structurally robust, stiff, rigid washer which provides both (i) support to the seal body against outwardly-directed internal pressures within the cell and (ii) support to the bottom plate against inwardly directed impact forces from outside the cell. Other current collector assemblies performing the same function, but having different components or equivalent structures fall within the scope of the present invention.

Figure 1A:
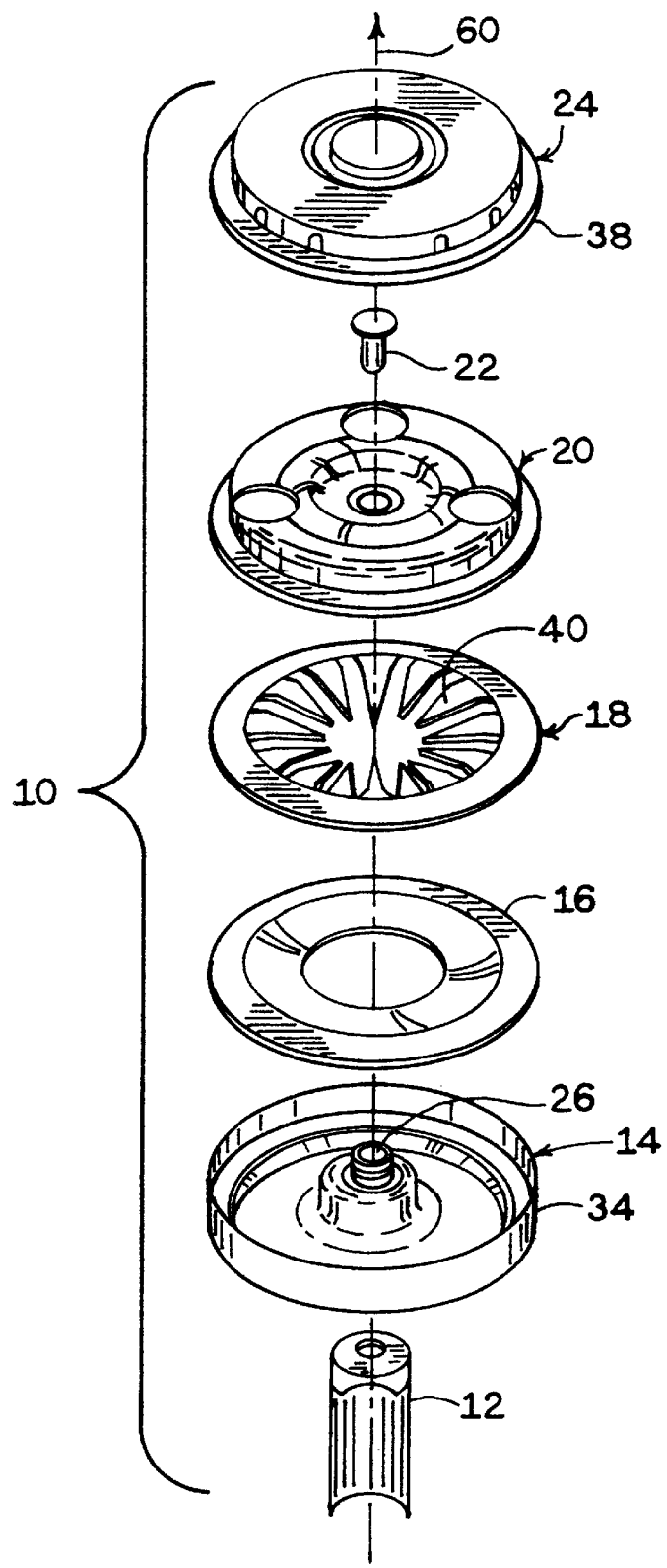
FIG. 1(a) shows a pictorial exploded view of a first prior art current collector assembly.

The invention is not limited in its application to the details of construction and the arrangement of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

Throughout the drawings, like numbers refer to like parts. The terms "cell," "electrochemical cell," and "battery" are used interchangeably, and may refer to a dry cell, an electrochemical cell, a battery, or a plurality of electrochemical cells, dry cells, or batteries, or the like.

As used herein, directional terms such as "up," "down," "upper," "lower," "upwardly," "downwardly," "top," and "bottom" relate to the orientations shown on the drawings being discussed. Once a direction has been discussed with respect to a given element, that same orientation is held consistent for that element, even in e.g. FIG. 6 where the orientation is reversed, unless otherwise specifically changed in a specific discussion.

FIG. 1(a) shows a pictorial exploded view of a prior art current collector assembly 10 used in a primary cylindrical alkaline manganese dioxide electrochemical cell Current collector assembly 10 comprises current collector 12, gasket or seal body 14, vent rupture control plate 16, gasket puncture plate 18, washer 20, rivet 22, and bottom plate 24. Current collector 12 is secured to the bottom side of seal body 14 by rivet 22, which is inserted through central opening 26 of seal body 14. Rivet 22 is in electrical contact with bottom plate 24.

Figure 1B:
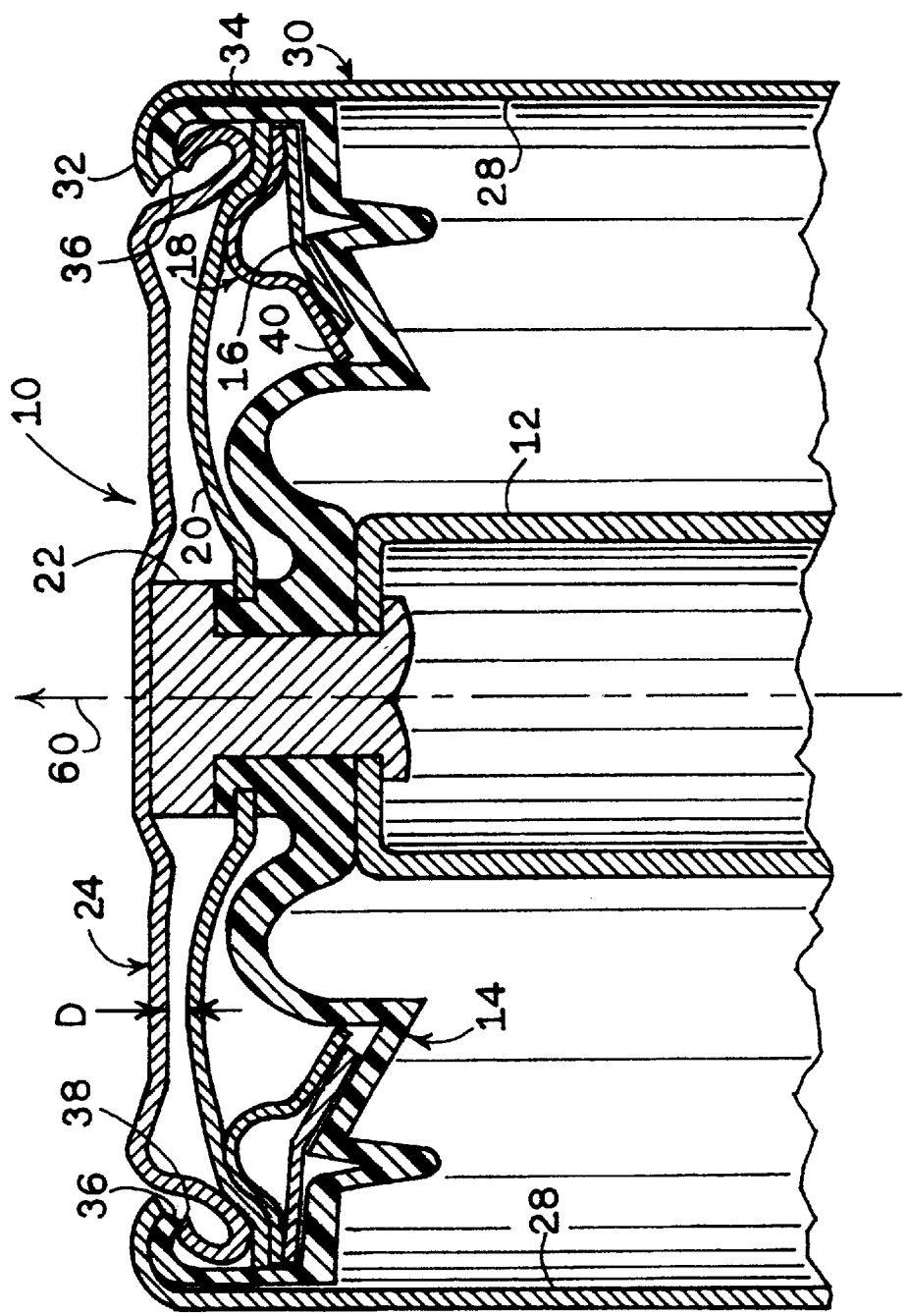
FIG. 1(b) shows a cross-sectional view of the current collector assembly of FIG. 1(a) disposed within a cylindrical alkaline manganese dioxide electrochemical cell.

FIG. 1(b) shows a cross-sectional view of the prior art current collector assembly of FIG. 1(a) when assembled and disposed inside a cell, with the bottom (anode end) of the cell at the top of the FIG. Inner sidewalls 28 of cup-shaped cathode can 30 engage outer upstanding wall 34 of seal body 14. The open end edges of can 30 are crimped inwardly at 32 so that the distal edge 36, and proximate portions, of upstanding wall 34 is crimped between can 30 and the outer peripheral edge 38 of bottom plate 24, thereby forming a desirably tight bottom seal for the cell.

Referring again to FIGS. 1(a) and 1(b), as the internal pressure becomes great enough, upstanding radial portions of the seal body, shown adjacent teeth 40 in FIG. 1(b), engage teeth 40 of gasket puncture plate 18. As the internal pressure of the cell increases further, continued upward movement of seal body 14 pushes the thickness of seal body 14 past the ends of teeth 40. The generally immobile teeth 40 thus puncture seal body 14, making holes in the seal body. Once punctured, seal body 14 permits egress of gas through the holes, thereby relieving the pressure inside the cell.

Figure 2A:
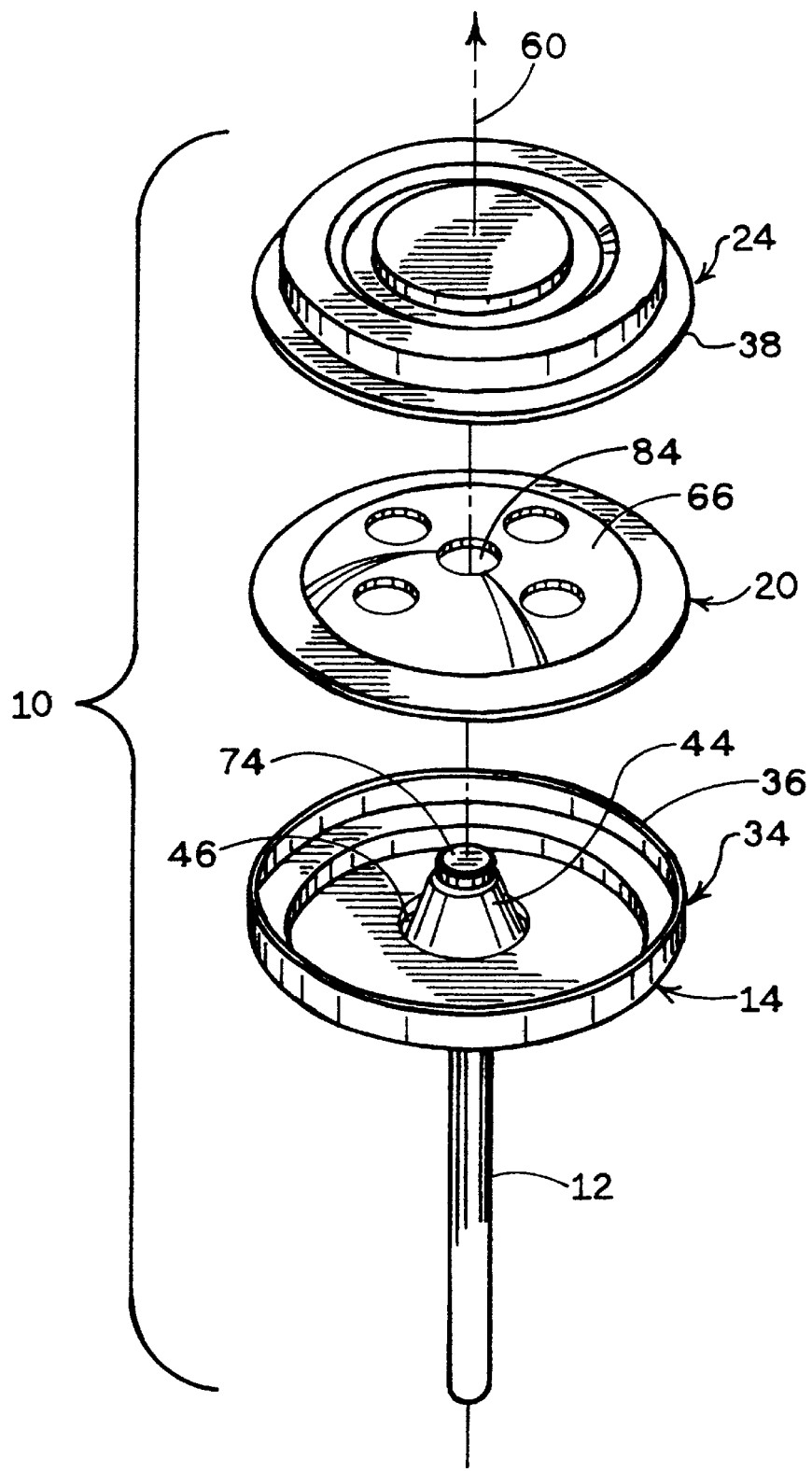
FIG. 2(a) shows a pictorial exploded view of a second prior art current collector assembly.

FIG. 2(a) shows a pictorial exploded view of prior art current collector assembly 10 used in a primary cylindrical alkaline manganese dioxide electrochemical cell. As seen in FIG. 2(a), current collector assembly 10 comprises current collector 12, gasket or seal body 14, washer 20, and bottom plate 24. When the internal pressure of a cell containing current collector assembly 10 of FIG. 2(a) reaches a certain predetermined level, seal body 14 ruptures at thin-walled vent panels 46, permitting egress of gas from the cell, and thereby relieving pressure inside the cell.

Figure 2B:
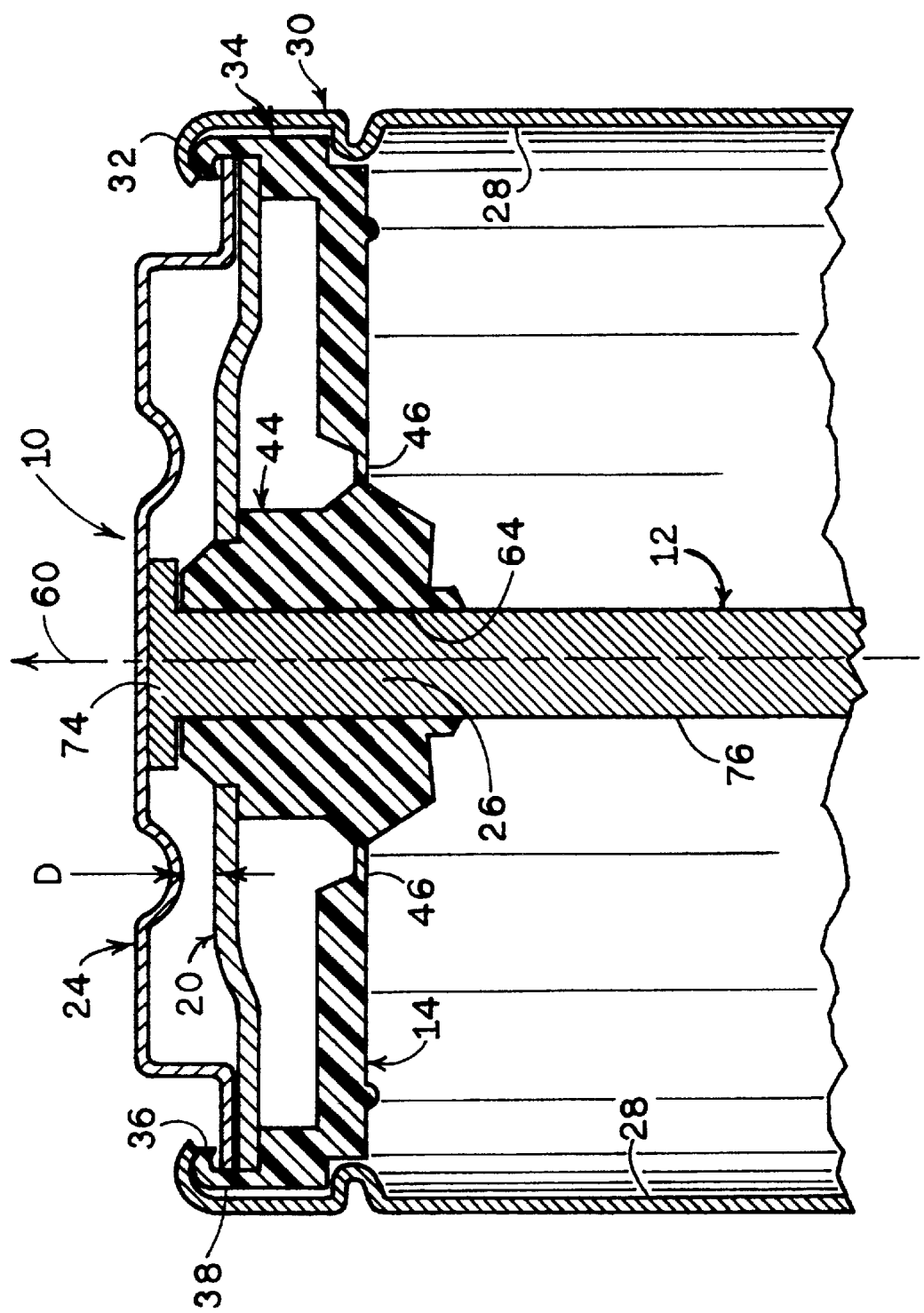
FIG. 2(b) shows a cross-sectional view of the current collector assembly of FIG. 2(a) disposed within a cylindrical alkaline manganese dioxide electrochemical cell.

FIG. 2(b) shows a cross-sectional view of the prior art current collector assembly 10 shown in FIG. 2(a) when assembled and disposed inside a cell, with the bottom (anode end) of the cell at the top of the FIG. Inner sidewalls 28 of can 30 engage outer peripheral edges 34 of seal body 14. The open end edges of can 30 are crimped inwardly at 32 so that the distal edge 36, and proximate portions, of upstanding wall 34 is crimped between can 30 and the outer peripheral edge 38 of bottom plate 24, thereby forming a desirably tight bottom seal for the cell.

An external impact force may be delivered to the outer surface of bottom plate 24 when a cell, or a flashlight containing one or more cells, is dropped to the ground or onto any hard surface. A cell containing a current collector assembly 10 of the embodiment of FIGS. 1(a) and 1(b) displays generally good resistance to impact forces delivered to the outer surface of bottom plate 24. Under normal impact force conditions, the integrity of seal body 14 is normally preserved, and the cell does not rupture or leak electrolyte as a result of such impact forces.

Figure 2C:
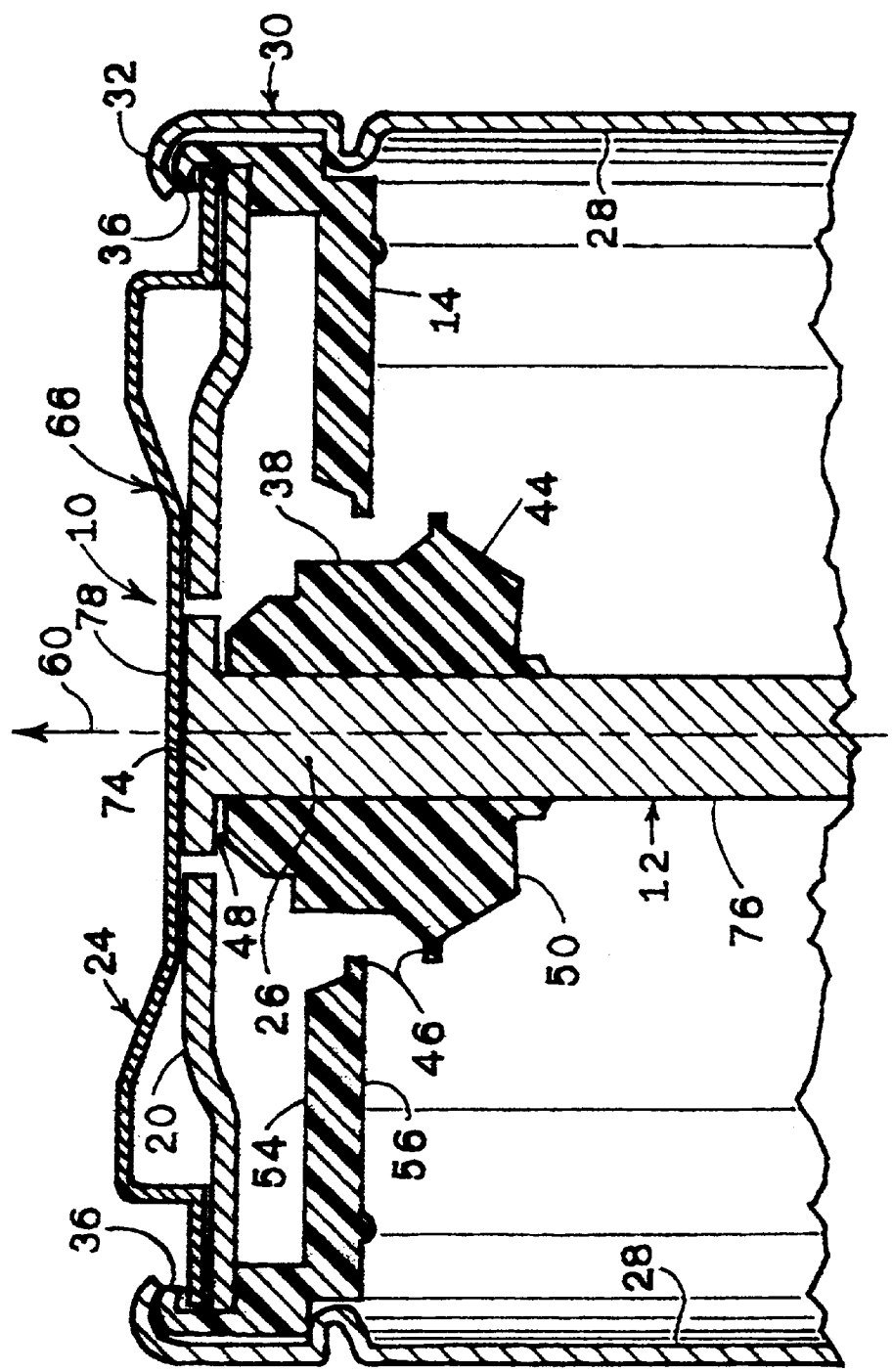
FIG. 2(c) shows a cross-sectional view as in FIG. 2(b), after the bottom of the cell has received a significant external impact force.

Contrary to the embodiment of FIGS. 1(a) and 1(b), a cell containing a current collector assembly 10 of the embodiment shown in FIGS. 2(a) and 2(b) does not consistently display good resistance to impact forces delivered to the outer surface of bottom plate 24. FIG. 2(c) shows the cell of FIG. 2(b) after a downwardly directed impact force of relatively significant magnitude has been delivered to the outer surface of bottom plate 24. In FIG. 2(c), the impact force has dented the central region 78 of the main body 66 of bottom plate 24 inwardly, pushing current collector 12 and central hub 44 inwardly of the cell, and thus detaching central hub 44 from the remainder of seal body 14 at vent panel 46. With the seal body 14 thus ruptured, electrolyte may leak from the cell of FIG. 2(c) through ruptured vent panel 46.

The seal body 14 of the cell of FIG. 1(b) often does not rupture when impact forces act on bottom plate 24. However, the current collector assembly of the cell of FIG. 1(b) contains 7 major components, namely current collector 12, seal body 14, vent rupture control plate 16, gasket puncture plate 18, washer 20, rivet 22, and bottom plate 24. The seal body 14 of the cell of FIG. 1(b) does often rupture when impact forces act on bottom plate 24. However, the cathode assembly of the cell of FIG. 2(b) contains only four major components, namely current collector 12, seal body 14, washer 20 and bottom plate 24.

Thus, while the current collector assembly shown in FIGS. 1(a) and 1(b) exhibits robust performance respecting external impact forces, it is complex in design and has a relatively large number (7) of piece parts. By comparison, the current collector assembly shown in FIGS. 2(a) and 2(b) contains 42% fewer piece parts, thereby reducing inventory costs, parts costs, labor and manufacturing costs, and the like; but does not exhibit satisfactory tolerance for external impact forces.

The foregoing description shows that known current collector assemblies which provide good resistance to external impact forces contain a relatively larger number of piece parts, are expensive to manufacture, and bear related higher unit costs. Known current collector assemblies which contain a relatively smaller number of piece parts, and which therefore are not unduly expensive to manufacture, do not provide acceptable resistance to external impact forces. What is needed is a current collector assembly which provides good resistance to external impact forces, but which also contains a relatively smaller number of piece parts.

Figure 3A:
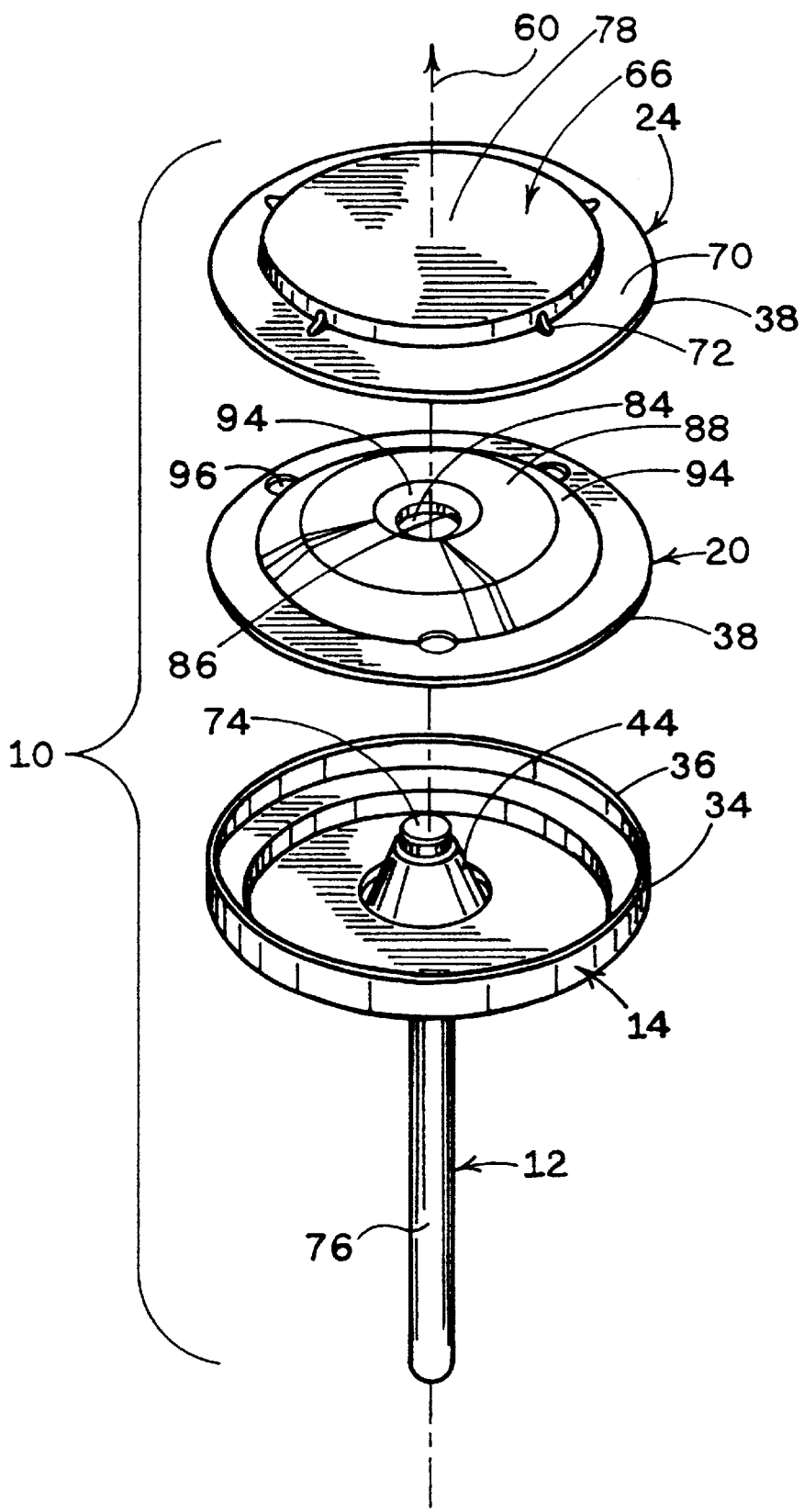
FIG. 3(a) shows a pictorial exploded view of a current collector assembly of the invention.
Figure 3B:
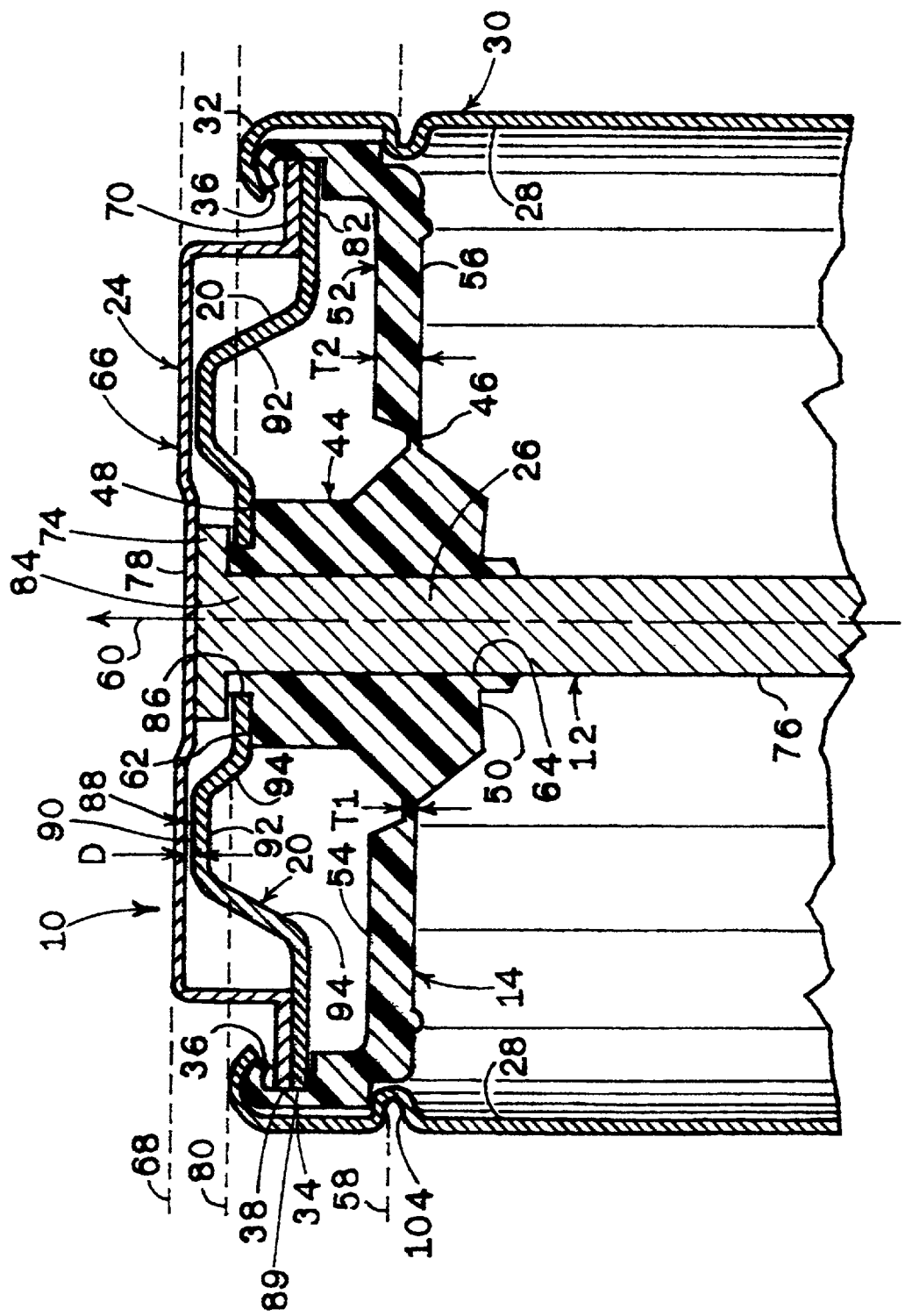
FIG. 3(b) shows a cross-sectional view of the current collector assembly of FIG. 3(a) disposed within a cylindrical alkaline manganese dioxide electrochemical cell.
Figure 3C:
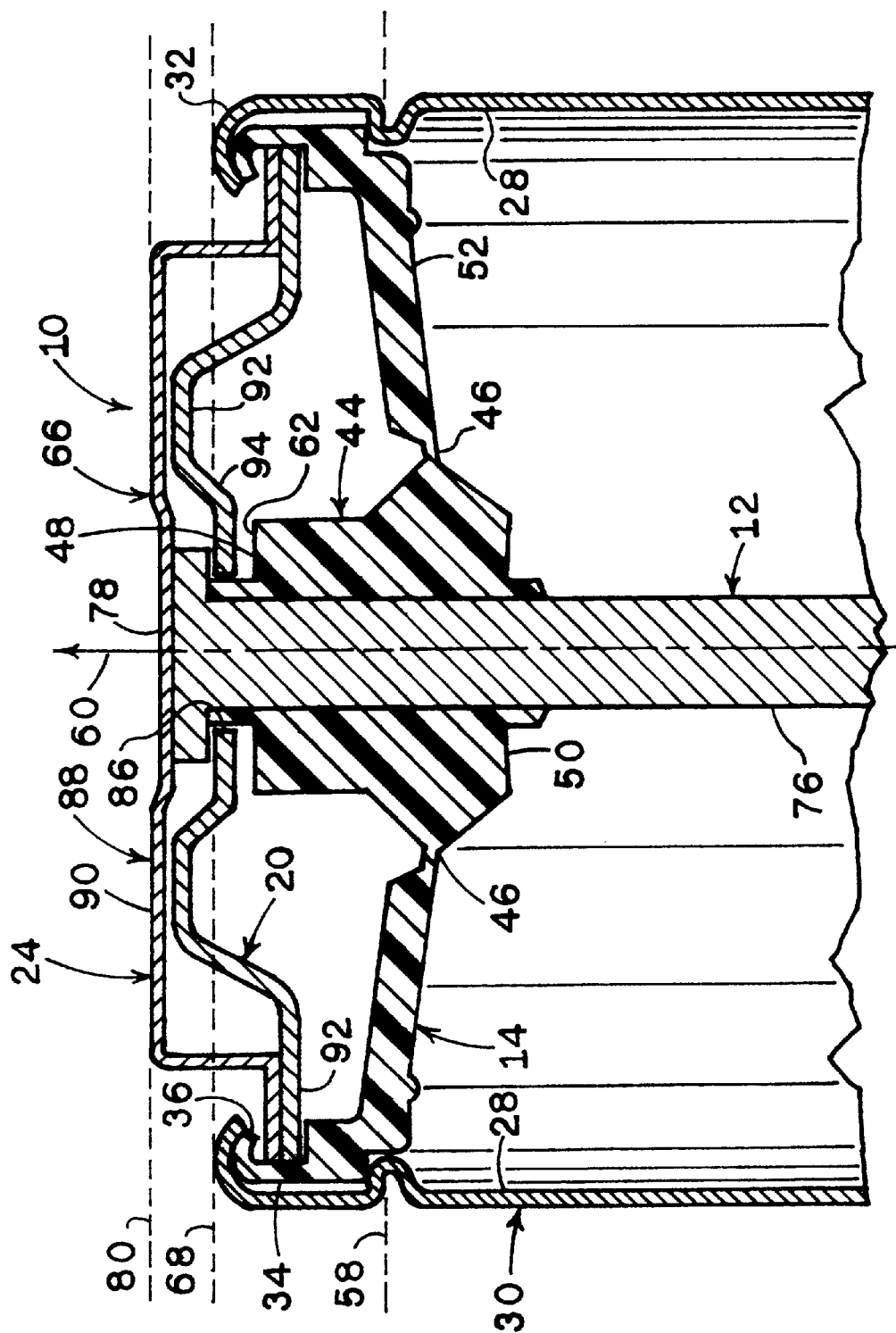
FIG. 3(c) shows a cross-sectional view as in FIG. 3(b), after the bottom of the cell has received a significant external impact force.

Referring now to FIGS. 3(a), 3(b), and 3(c), there is shown a current collector assembly 10 of this invention. The current collector assembly 10 includes seal body 14, current collector 12, washer 20, and bottom plate 24.

Overall, seal body 14 is generally shaped like a disk, and is made from electrically nonconductive material. Seal body 14 generally comprises central hub 44, outer member 52, upstanding outer wall 34 depending from an outer edge of outer member 52, and vent panel 46 between central hub 44 and outer member 52. In seal body 14, central hub 44 has an upper surface 48, a lower surface 50, and central aperture 26. Aperture 26 extends between the upper and lower surfaces 48, 50, along a central axis 60 of the seal body, and respectively of the aperture 26. Aperture 26 has a length extending along the axis 60, and includes inwardly facing sidewall 64 extending along that length. Aperture 26 has upper and lower ends, corresponding with upper and lower ends of sidewall 64, adjacent upper and lower surfaces 48, 50 respectively.

Outer upstanding wall 34 depends from the outer edge of outer member 52 and thus defines the outer perimeter of the seal body.

Outer member 52 has a top surface 54 and a bottom surface 56, and is generally disposed in an imaginary plane 58. Outer member 52 extends in a generally outward direction from central hub 44.

Vent panel 46 can be disposed anywhere between hub 44 and the outer perimeter of seal body 14, and is generally disposed between hub 44 and the outer edge of the outer member. Vent panel 46 has a thickness "T1" less than a respective thickness "T2" between top and bottom surfaces 52, 54 of the outer member, and less than a respective thickness between the upper and lower surfaces of central hub 44. Thus, vent panel 46 has the smallest thickness of the major elements of the seal body. Accordingly, when pressure builds up inside a cell using the seal body of FIGS. 3(a)–(c), rupture of the seal body to relieve the pressure is effected by the seal body 14 being ruptured at vent panel 46.

Suitable materials from which the seal body may be manufactured include plastics, such as, for example nylon, polypropylene, filled polypropylene, and the like. Preferred material is nylon, especially injection molded nylon 6,6.

Electrically conductive bottom plate 24 has a main body 66 generally lying in a second imaginary plane 68 which is aligned with outer member 52 of seal member 14, and respectively with first imaginary plane 58. An outer ring 70 depends downwardly from main body 66, and generally extends outwardly parallel to main body 66. A plurality of holes 72 extend through bottom plate inwardly of the outer edge of outer ring 70, and adjacent the outer edge of main body 66. A preferred material for use as the bottom plate in alkaline manganese dioxide primary cells is nickel plated low carbon cold rolled strip steel.

Current collector 12 is an elongated electrical conductor, and generally resembles a nail. The current collector thus has a head 74, and an elongated shank 76 extending away from head 74. Preferably, the current collector 12, and especially the shank 76, is symmetrically shaped. Most preferably, shank 76 is shaped like a rod. The outer surface of shank 76 is preferably free of imperfections such as burrs, nicks, and scratches. Non-symmetrical current collectors may be used provided accommodating modifications are made in cooperating ones of the other elements of the current collector assembly 10. Current collector 12 can be made from a wide variety of conductive materials such as brass, zinc, zinc alloys, nickel plated steel, and tin plated steel. The material preferred for a given cell will depend on the other structural and chemical elements to be used in the cell. A preferred current collector for use in alkaline manganese dioxide primary cells is a nail made from 0.057 inch diameter brass wire which is electroless tin plated to a tin thickness of 0.08 micron after the current collector is shaped as shown in FIGS. 3(a)–3(c).

Shank 76 has a cross-section slightly larger than the cross-section of aperture 26 in seal body 14. Shank 76 can be pushed through aperture 26, but only with a frictional engagement between sidewall 64 of aperture 26 and the outer wall of the shank.

Head 74, at its top, is welded or otherwise secured physically and for electrical conduction, to the central region 78 of main body 66 of bottom plate 24.

Washer 20 is generally disk-shaped, but has specific shape, material, and positioning requirements which provide it with physical properties critical to the invention. Preferred material for washer 20 is a metal disk stamped from 0.031 inch thick hot-dip zinc coated, number 3 temper, galvanized cold rolled carbon steel. The resulting stamped washer has a generally uniform thickness, allowing for slight deformities from the stamp-forming process. Other materials, including other metal alloys, are contemplated as being suitable so long as then provide structural support to the bottom plate, and to seal body 14, as described herein. The washer of the prior art structure shown in FIGS. 2(a)–(c) is made from similar material but having the softer temper number 4.

Washer 20 is generally aligned with outer member 52 of seal body 14, and thus is generally aligned with first and second imaginary planes 58, 68, and can be described as generally following its own imaginary plane 80, though with significant deviations on both sides of plane 80. The washer 20 is also aligned with the seal member across central axis 60. Outer ring 82 of washer 20 is generally parallel with plane 80, generally corresponds with and underlies outer ring 70 of the bottom plate (FIGS. 3(a)–(c)), and extends circumferentially about the washer. Central aperture 84 extends through the washer 20, centered on axis 60, and has an inwardly facing edge 86. As shown, the distance between aperture 84 and central region 78 of main body 66 is preferably less than the distance between outer ring 82 and the central region 78. Imaginary plane 80 generally passes through inwardly facing edge 86 of aperture 84.

Circular plateau 88 extends upwardly between aperture 84 and outer ring 82, preferably closer to aperture 84 than to outer ring 82. Thus, upper surface 90 of the washer has a convex contour at plateau 88, and the lower surface 92 has a corresponding concave contour. In preferred embodiments, the inner and outer edges of plateau 88 define generally upstanding segments 94 of the washer between aperture 84 and outer perimeter 89 of the washer, extending circumferentially about significant portions of the circumference of the washer (referring to orientations shown in FIGS. 3(a)–3(c). In general, upstanding segments 94 intersect plane 80 at angles of at least about 30 degrees, preferably about 45 degrees to about 60 degrees. Angles up to 90 degrees are acceptable so long as the material can be formed without undue stress and cracking of the metal.

Circumferentially inclined upstanding segments 94 reinforce the washer structurally against downward deflection when subjected to downwardly-directed forces. Thus, upstanding segments provide an I-beam type reinforcement to an otherwise rather flat washer. The overall effect of the upstanding segments is to increase resistance of the washer to bending at and adjacent the plateau 88. With plateau 88 positioned radially close to aperture 84, plateau 88 is in a good position to absorb impact forces directed toward the central region of main body 66. Preferred angles are around 45 to 60 degrees. These intermediate angles can be formed in a variety of suitable materials without excess stress and cracking, and provide the desirable I-beam effect. Preferred inner radius "R" on opposing sides of the upstanding segments 94 is about 0.025 to about 0.060 inch, with most preferred inner radius about 0.04 inch.

In a preferred embodiment, plateau 88 is displaced from plane 80, and thus from aperture 84, by about 0.06 to about 0.08 inch upwardly; while outer ring 82 is displaced from plane 80, and thus from aperture 84, by about 0.025 to about 0.045 inch.

In all embodiments, plateau 88 is positioned radially sufficiently close to aperture 84 to provide physical structural support to bottom plate 24 in the central region. The support should be effective to reinforce bottom plate 24 against impact forces directed against the outer surface of the bottom plate.

In washer 20 of the invention, disclosed in FIGS. 3(a)–(c), pressure relief holes 96 are spaced outwardly from plateau 88 in order that the holes 96 not weaken the structural supporting effect of plateau 88.

The function of washer 20 in conventional current collector assemblies as discussed above is to position and retain the seal body 14 at the desired location along central axis 60. In general, prior art current collector assemblies were directed at preventing deflection of the seal body, especially outwardly-directed deflection, toward bottom plate 24. Excessive such movement is known to result in leakage of electrolyte.

Washers 20 of the invention maintain this traditional function while, in addition, providing primary structural support to bottom plate 24 against inwardly-directed impact forces imposed against the outer surface of bottom plate 24. Thus, in the prior art structures discussed above, the washer 20 is spaced too far from bottom plate 24 to provide structural support to bottom plate 24 in absorbing outside impact forces on the bottom plate until after the vent panel has been ruptured. In the invention, the washer is close enough to the bottom plate that the bottom plate moves a much shorter distance (e.g. 0.010 inch) before contacting the washer. Further, the washer is stiffer, more rigid than prior art washers. Thus, when a force is imposed against the bottom plate, the force is transferred to the washer more quickly (after a shorter distance of travel of the bottom plate), and the bottom plate is more effective in absorbing the force and distributing and dissipating the force within the battery structure without imposing such force on hub 44 to such an extent that the vent panel 46 ruptures. Further, as shown by the deflection tests represented in FIG. 9, the washer of the invention is effective to resist gradually increased force essentially devoid of the impact feature. Thus, the force being resisted by washer 20 need not be an impact force, and can be a gradually applied force.

In the prior art structure of FIGS. 1(a) and 1(b), the washer is spaced from bottom plate 24 by about 0.024 inch. In the prior art structure of FIGS. 2(a) and 2(b), the washer is spaced from bottom plate 24 by about 0.050 inch, and has a temper number 4, which is too soft to provide adequate support to base plate 24.

In the invention herein, the washer 20 is structurally reinforced, as compared to conventional washers used in anode current collector assemblies, by means of the curvilinear cross-sectional shape 88, giving it its plateau contour, and by its harder temper. In addition, the plateau 88 is positioned sufficiently close to bottom plate 24 to provide primary structural support in absorbing an outside impact force against the outer surface of bottom plate 24. Further, the distance between axis 60 and plateau 88 is held sufficiently small that impact forces imposed generally on bottom plate adjacent axis 60 will be transferred to washer 20 without damaging movement of bottom plate against current collector 12. Thus, the inner radius of plateau, adjacent bottom plate is desirably no more than about 0.15 inch to about 0.25 inch.

In order that impact forces be readily transferred from bottom plate to washer 20, the top surface of plateau 88 is generally positioned within a distance "D" of 0.018 inch of the inner surface of bottom plate 24. Preferred spacing between plateau 88 and bottom plate 24 is about 0.003 inch to about 0.015 inch. Spacings of between about 0.006 and about 0.012 inch are most preferred. The most preferred spacings provide a good balance between (i) providing some assured spacing between washer 20 and bottom plate 24 and (ii) placing the washer sufficiently close to the bottom plate that the washer provides effective structural support to the bottom plate at impact. Comparative "D" is shown in Prior Art FIGS. 1(b) and 3(b) to illustrate areas of the cross-sections which can be compared. In conventionally available product of Prior Art of the FIG. 1 series, "D" is about 0.024 inch. In conventionally available product of Prior Art of the FIG. 2 series, "D" is about 0.050 inch. Especially the 0.050 inch spacing is inadequate to protect vent panel 46 from premature rupture. However, spacing greater than 0.018 can protect vent panel 46 where the washer is sufficiently rigid as in the novel washers 20 disclosed herein. Thus, spacings up to about 0.030 inch are contemplated, although the spacing is generally no more than about 0.024 inch.

It is critical that the washer 20 be sufficiently hard and stiff in order to satisfactorily support bottom plate against impact forces. The hardness of the unsatisfactory control washer of the FIG. 2 series is shown in Table 1, in comparison with the hardness of satisfactory washers as described for the invention.

TABLE 1

| Washer Type | Vickers | Rockwell B |
| --- | --- | --- |
| Control | 125 | 69 |
| Invention | 159 | 81 |

A preferred embodiment of the current collector assembly 10 of FIGS. 3(a)–(c) is assembled as follows. Head 74 of current collector 12 is welded to the inside surface of bottom plate 24, at the center of the bottom plate. The shaft 76 of the current collector is then inserted through aperture 84 of washer 20, and is driven through aperture 26 of the hub, accompanied by frictional engagement between the shank and the sidewall 64 of the aperture. A sealant is placed on the portion of the shank which will be under the head and protruding into the hub. Seal body 14 is coated with a synthetic rubber coating to protect the seal body from chemical action of the electrochemical reactants to be contained in the electrochemical cell. The current collector assembly is then complete, and ready for use in an electrochemical cell.

Referring to FIG. 3(b) wherein the current collector assembly has been assembled into an electrochemical cell, a central portion of washer 20 adjacent aperture 84, and including edge 86, is seated on seat 62 of hub 44, controlling the position of the hub 44, and thus of seal body 14. Washer 20 especially positions and retains the seal body against outwardly-directed pressures built up in the cell by e.g. chemical reactions taking place within the cell.

In the embodiment of FIGS. 3(a)–(c), the edge 86 extends somewhat under the head 74 of current collector 12, providing direct support to the head 74 against forces directed inwardly against the bottom plate. However, in general, the washer need not extend under head 74 in order to provide the desired level of support for bottom plate 24 because the small radius of plateau 88 positions the plateau close enough to head 74 to provide adequate protection for the head in most situations.

Figure 4A:
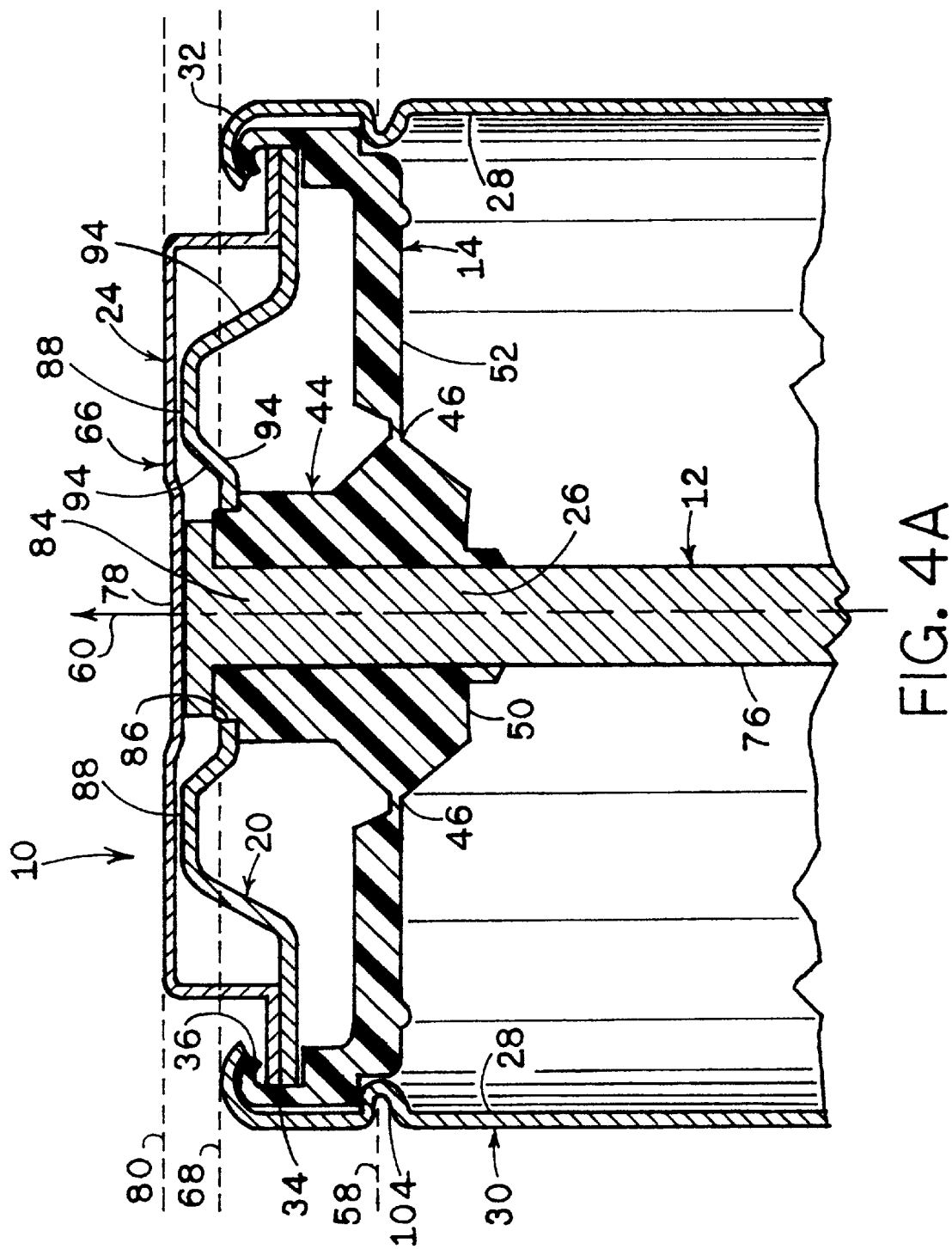
FIGS. 4(a) and 4(b) shows second and third embodiments of the washer of the invention in cathode assemblies.

FIG. 4(a) illustrates a second embodiment of washer structure wherein the aperture 84 has an opening sufficiently large to receive head 74 therethrough. Accordingly, in the embodiment of FIG. 4(a) of the invention, washer 20 provides no direct support of the current collector itself. Rather, washer 20 protects the current collector by supporting bottom plate 24 adjacent head 74.

Figure 4B:
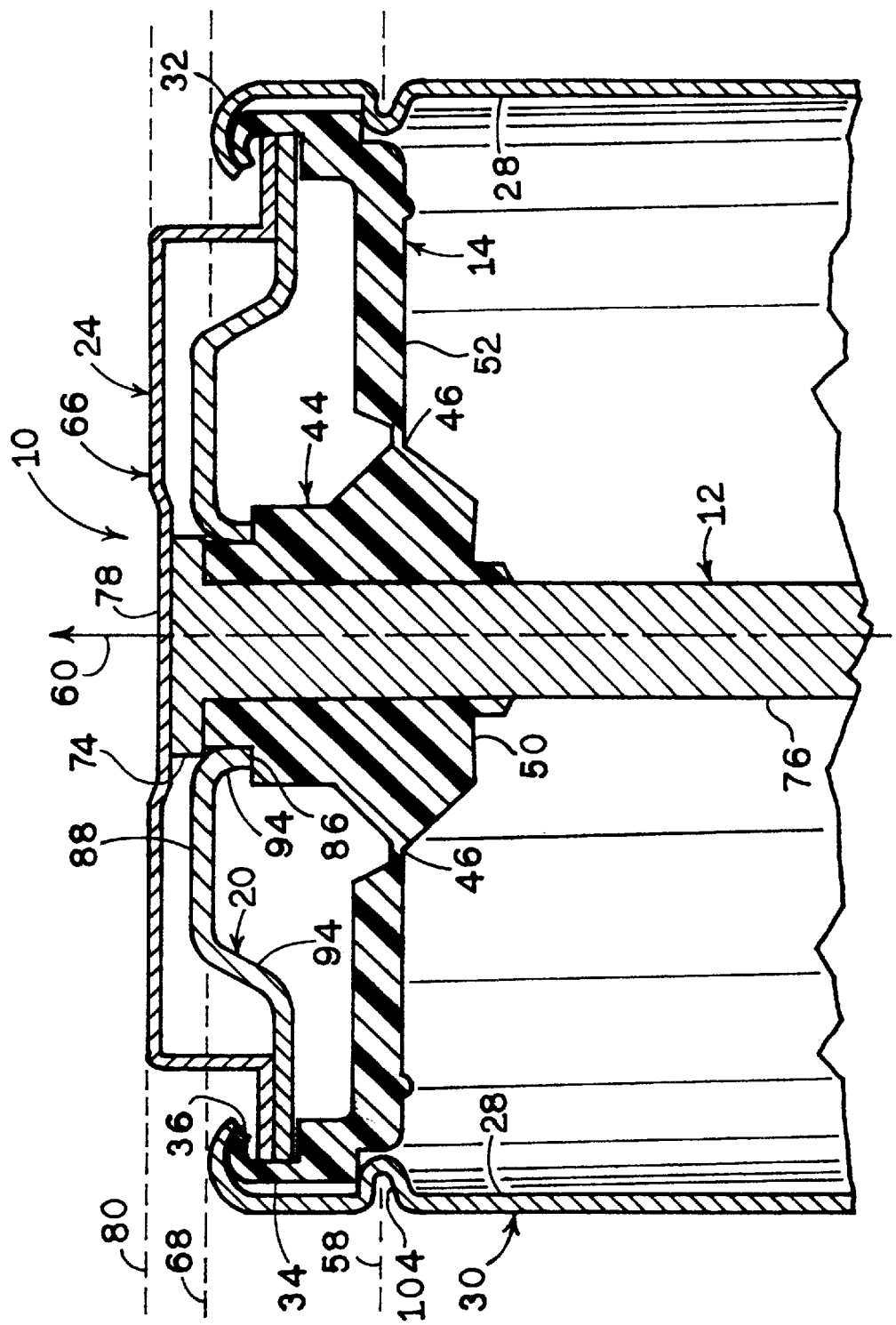

FIGS. 3(a)–(c) and 4(a) illustrate washers wherein the structure from plateau 88 inwardly generally describes a stretched-out "S" shape. FIG. 4(b) shows yet another embodiment of the washer wherein plateau 88 extends generally to the outer edge of head 74 and the inner upstanding segment 94 of the washer touches and directly supports head 74 at its outer radius. In this embodiment, the structure from plateau 88 inwardly generally describes a downwardly-opening "C" shape, wherein the final inwardly disposed horizontal portion of the washer adjacent edge 86 has been omitted. Accordingly, in FIG. 4(a), edge 86 faces downwardly, rather than inwardly.

Figure 5A:
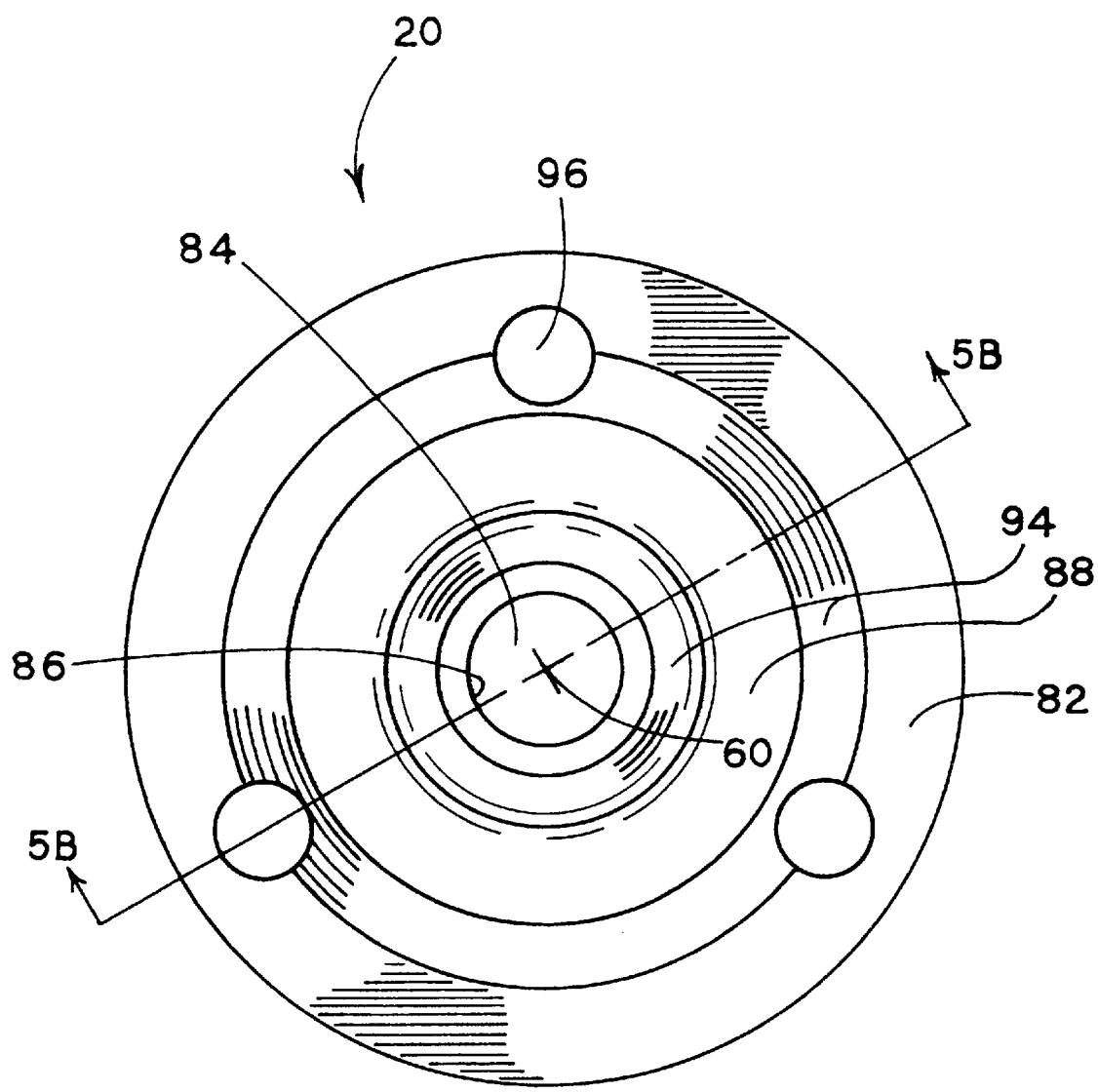
FIG. 5(a) shows a plan view of an improved washer of the invention.
Figure 5B:
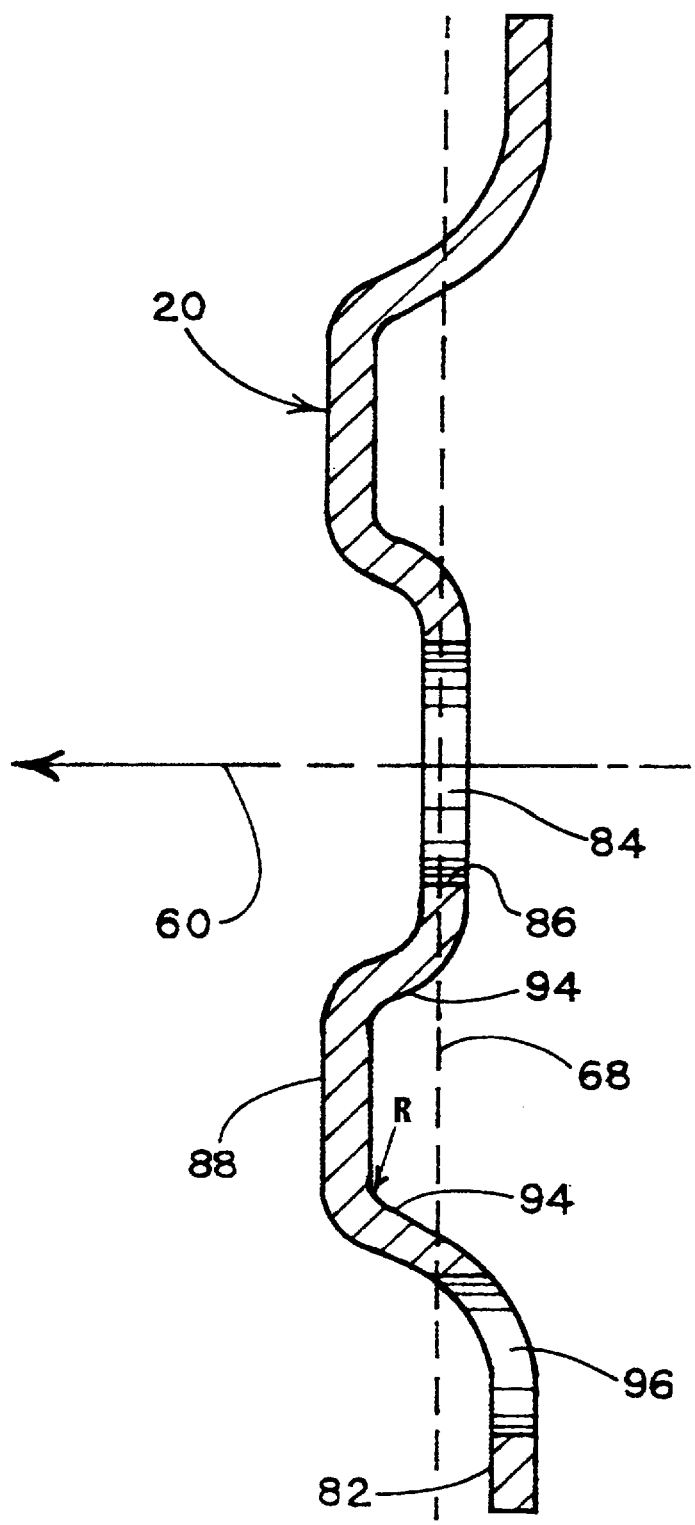
FIG. 5(b) shows a cross-section of the washer of FIG. 5(a), taken at 5(b)—5(b) of FIG. 5(a).

FIG. 5(a) shows detail of washer 20 from the top. FIG. 5(b) shows an enlarged cross-section of the washer, especially illustrating plateau 88, and the height of plateau 88 above aperture 84.

Figure 6:
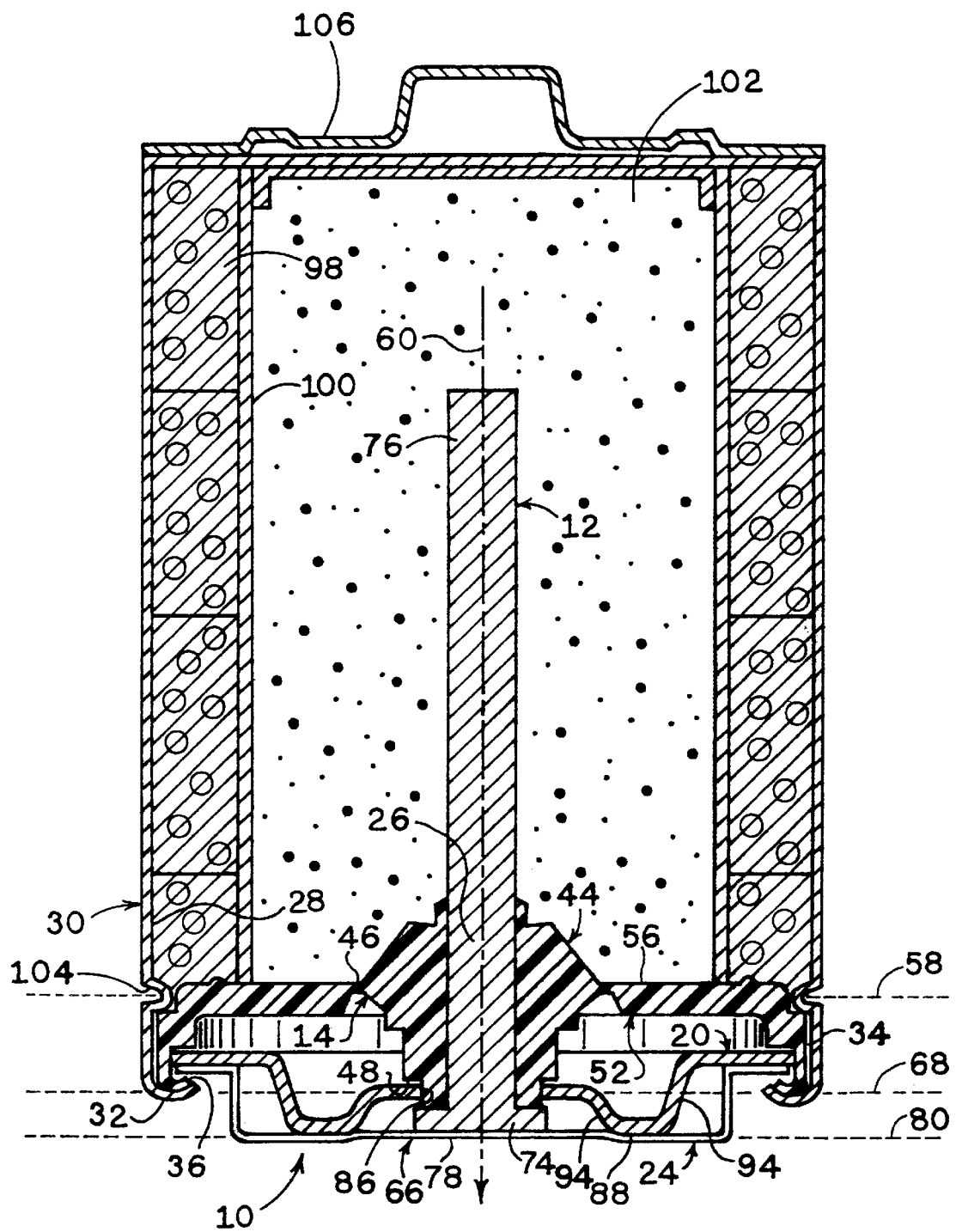
FIG. 6 shows an exemplary electrochemical cell using an improved washer, and anode assembly, of the invention.

The current collector assembly as described above is incorporated into e.g. an alkaline manganese dioxide as shown in FIG. 6 as follows. An appropriate number of rings 98 of manganese dioxide cathode material are stacked in a cathode can 30. A separator 100 is then inserted inside the manganese dioxide rings. An appropriate amount of zinc anode material 102 is then placed inside the separator, the combination of anode material, cathode material, and separator then generally filling the cathode can. The anode current collector assembly 10 is then placed in the can, driving the shank 76 of the current collector 12 into the anode material 102. This brings the shank into electrical contact with the zinc anode material, and brings the coated bottom surface 56 of outer member 52 of seal body 14 into sealing contact with the manganese dioxide cathode material, separator 100, and the zinc anode material. The outer edges of upstanding wall 34 engage inner sidewalls 28 of the can. The can 30 is then crimped at groove 104 adjacent seal body 14; and the distal ends of the cathode can are crimped inwardly at 32. The distal edge 36 and proximate portions, of sidewall 34 is then crimped inwardly. This urges the ends of the can material, and the distal edge 36 and sidewall portions of outer upstanding wall 34 against the outer circumferential edge of bottom plate 24, and indirectly against the outer circumferential edge of washer 20. This crimping completes the closure of the cell, including the incorporation of the anode current collector assembly 10 into the cell, thereby forming a desirably tight bottom seal for the cell. The cathode plate 106, including the contact nubbin, is secured to the closed bottom of the cathode can as appropriate.

FIG. 6 illustrates the finished cell just described. As seen therein central axis 60 of the current collector assembly 10 also serves as the central axis of the cell.

Plateau 88 has been described and illustrated as circular, encompassing aperture 84. Plateau 88 comprehends a variety of configurations, only one of which is illustrated. The critical parameters respecting plateau 88 are its location, the stiffening properties provided by the upstanding segments 94, and the hardness of the tempered washer. Plateau 88 need not be circular. It does not need to completely enclose aperture 84. It does not need to be circumferential in nature. It can be discontinuous. It does need to be close enough to aperture 84 that it supports the bottom plate adjacent head 74 and axis 60.

EXAMPLES

All testing on cells as described below was conducted using "D-size" cells. The control cells used washers as described with respect to the FIG. 2 series. Temper of the control washers was temper number 4.

Figure 7:
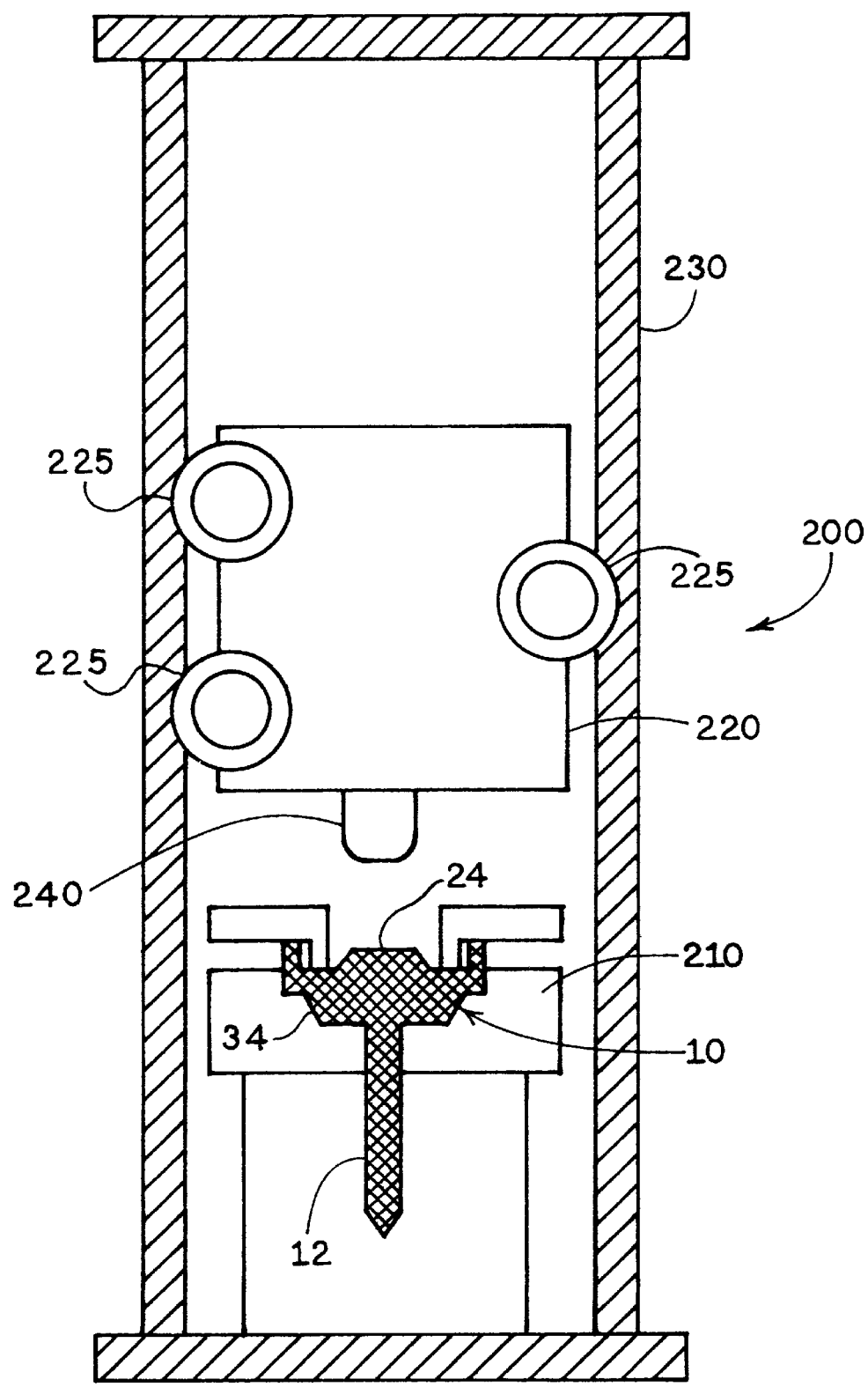
FIG. 7 shows a representative side elevation of a test stand used to test anode assemblies of the invention for impact tolerance.

Current collector assemblies as described above with respect to FIGS. 3(a)–(c) were made and drop tested using test apparatus illustrated in FIG. 7. The standard test for evaluating the bottom current collector assembly is one 3-foot drop of the cells in a 3-cell flashlight. The dropped flashlight is left "on" during the test.

A laboratory drop test apparatus was built to simulate drop testing in a flashlight. While the instrument provided a controlled test method, it did not completely duplicate the effect of one cell impacting upon another in a flashlight. When a flashlight is dropped, part of the force of impact against the bottom plate is absorbed by the deformation of the impacting cell's cathode nubbin and can bottom. The laboratory drop test used a solid steel nubbin 240 on a steel slide 220 (same weight as a standard "D-size" cell) mounted on a track 230 using wheels 225. The cell being tested was supported from the bottom by support block 210.

In the drop tests, the slide 220 was dropped onto the bottom plate 24 of the cell from heights of 1 foot to 4 feet.

FIG. 7 shows the cell in terms of the position of current collector assembly 10. Cells having current collector assemblies of the invention as described above with respect to the FIG. 3 series, and prior art current collector assemblies described with respect to the FIG. 2 series, were tested.

After the drop, the amount of denting in the bottom plate was measured. The cells were then opened and the vent panels 46 checked for rupture.

Figure 8:
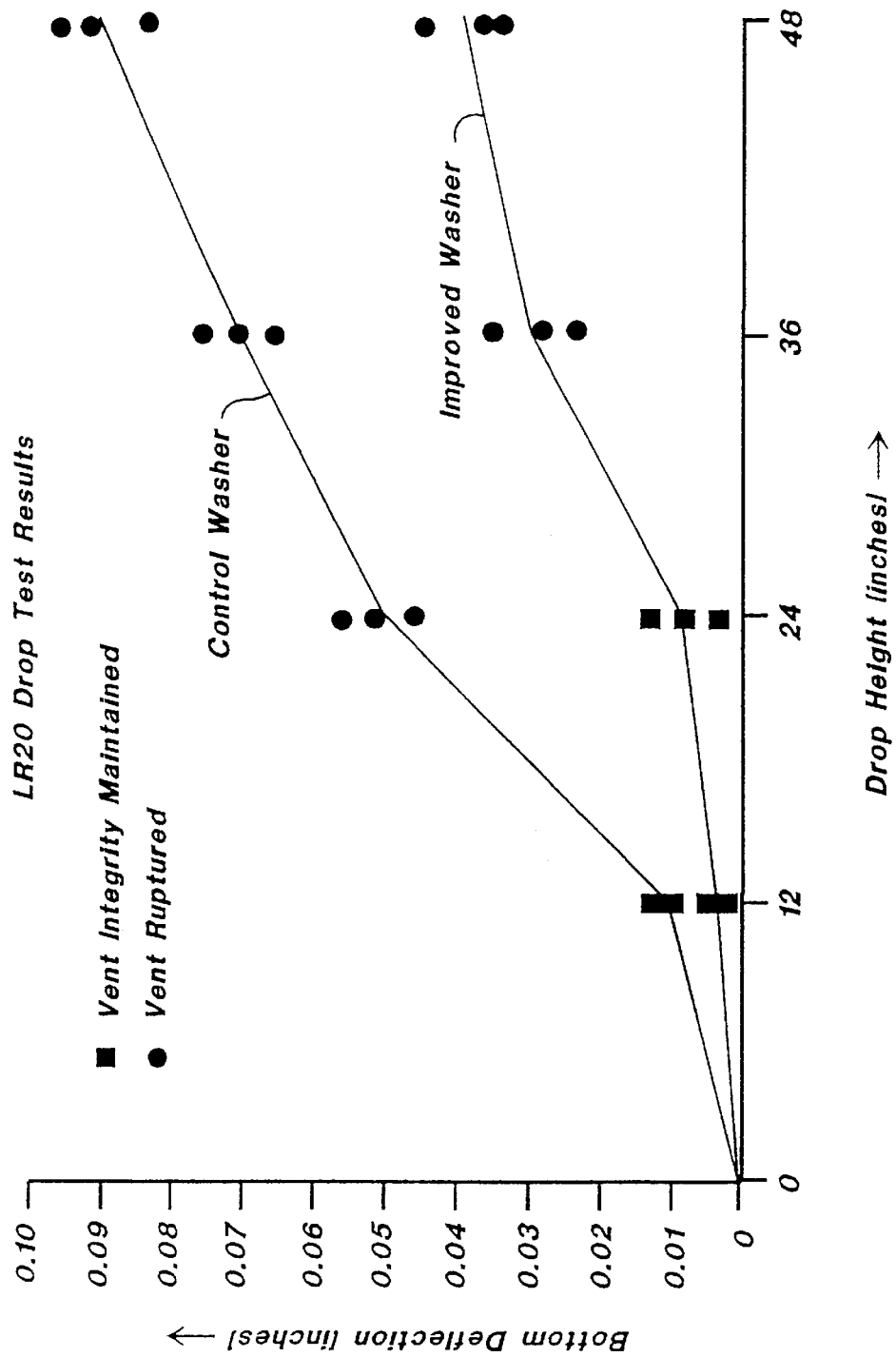
FIG. 8 is a graph showing comparative results of drop tests performed on anode assemblies of the invention, and prior art anode assemblies.

For the control cells of the FIG. 2 series, the effect of a three-foot drop using the laboratory tester correlated well with a 3-foot drop of a 3-cell flashlight. In both cases, the bottom plate was dented about 0.07 inch, and the vent panel 46 was ruptured. For cells with the washer 20 of the invention, the laboratory drop test caused greater damage than did the flashlight drop test. The magnitude of denting with the laboratory test was double the denting with the flashlight drop test, and some vents were ruptured. However, the denting was less severe, and rupturing was less frequent, using the washers of the invention. FIG. 8 shows graphically the results of the testing. As seen therein, the cells using the washers of the invention had significantly less denting than cells using the control washer. At 2-foot drop height, the cells of the invention had vent panels intact after the drop, while the vent panels in cells using the control washer had ruptured.

Figure 9:
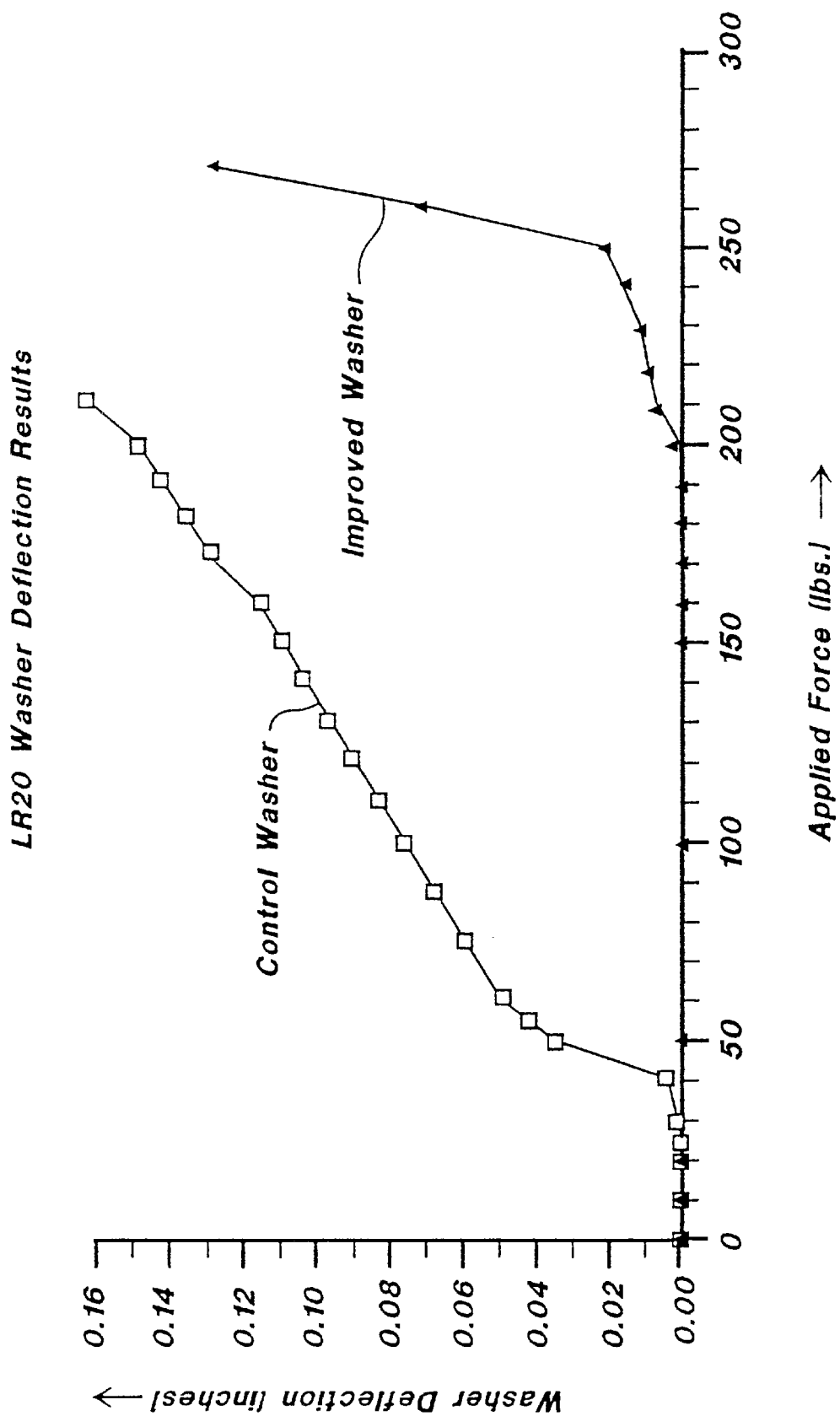
FIG. 9 is a graph showing comparative amounts of deflection for given amounts of force applied to the washer.

Another test was conducted to illustrate differences between the washer 20 of the invention and washers used in prior art current collector assemblies. In this test, increasing force was gradually applied to the center of the washer over an area equivalent to the size of the positive nubbin on a standard "D-size" cell. The washers were supported on their bottom surfaces at their outer edges. The deflection of the washer was recorded as a function of the force applied. FIG. 9 shows the results graphically. As seen therein, control washers of the prior art (FIG. 2 series) began to yield significantly at less than 50 pounds of force, while the washers of the invention did not exhibit any significant yield until about 200 pounds of force was applied.

Cells of the invention were also subjected to comparative flashlight drop testing. A 3-cell flashlight was dropped from a predetermined height with the flashlight left "on." The standard test was modified by opening the cells after completing the specified number of drops, and inspecting the cells to determine vent damage. Only the cell at the lens end of the flashlight was examined.

Figure 10:
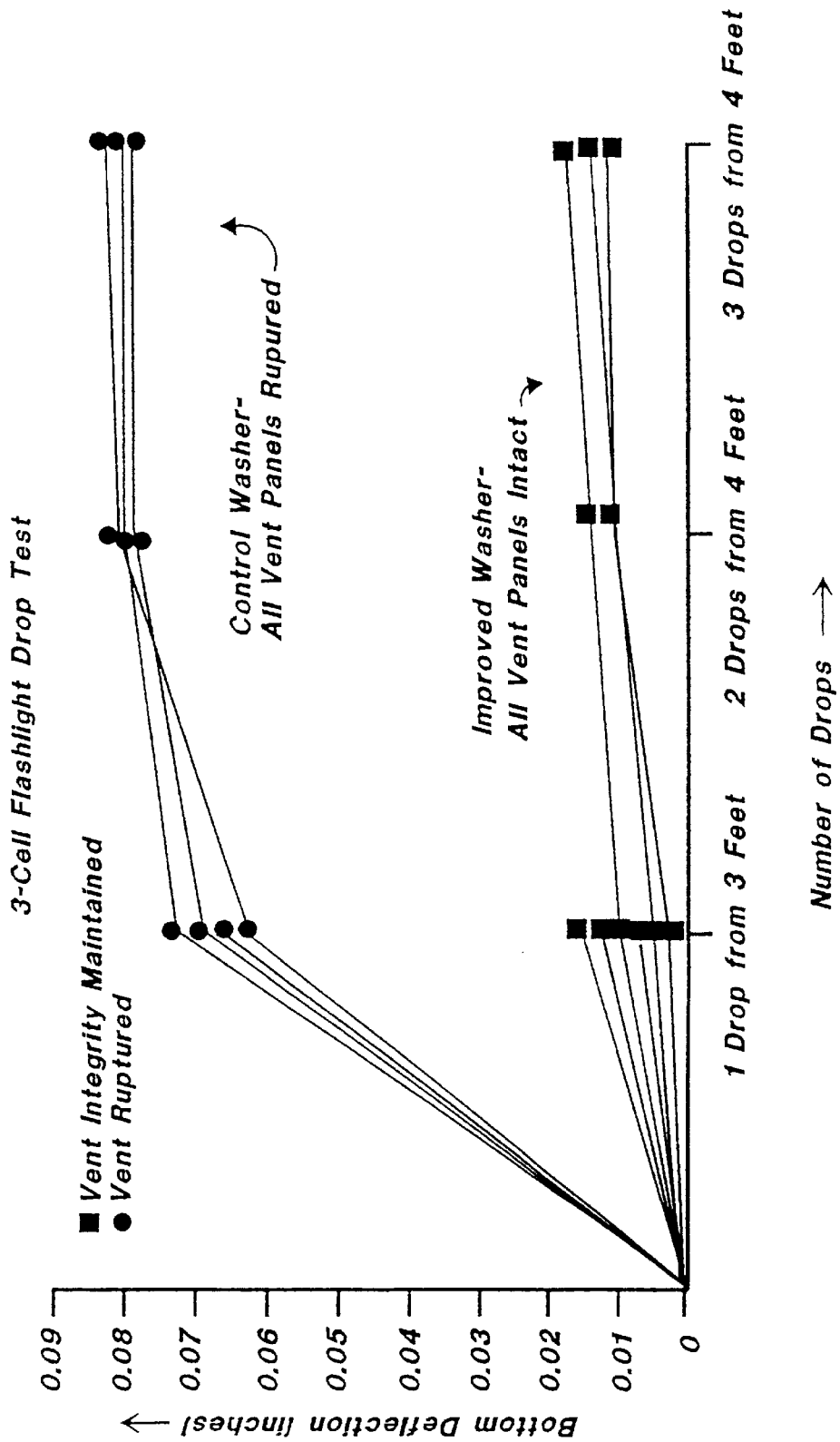
FIG. 10 is a graph showing vent ruptures from comparative drop tests.

The results show that repeated drops do proportionately less damage than the initial drop, perhaps because the nubbin of the impacting cell is also partially crushed by the impact of the first drop. Table 2 following illustrates the relative difference between the depth of crush in cells of the invention and in control cells. Corresponding results are shown graphically in FIG. 10.

TABLE 2

| Type Test | Washer | No. Cells | Bottom Plate Depth of Crush | No. Ruptured Vent Panels |
|---|---|---|---|---|
| One 3-Foot Drop | Control | 3 | 0.070 inch | 3 |
| One 3-Foot Drop | Invention | 3 | 0.011 inch | 0 |
| Three 3-Foot Drops | Control | 3 | 0.081 inch | 3 |
| Three 3-Foot Drops | Invention | 3 | 0.017 inch | 0 |

FIG. 3(c) shows the cross-section of the embodiment of FIGS. 3(a) and 3(b) after the bottom plate has received an impact force such as described herein with respect to testing. As seen therein, the washer, including the central portion of the washer at aperture 84, is in substantially the same place as before the impact force was applied. This can be seen by comparing the position of the washer in FIG. 3(c) with that depicted in FIG. 3(b). Referring to FIG. 3(c), hub 44 has been moved slightly downwardly on shank 76. The amount of downward movement has been exaggerated in FIG. 3(c) in order that the difference be readily noticeable. This downward movement of the hub results in outer member 52 extending from upstanding wall 34 toward the hub at a downward angle, seen in FIG. 3(c). However, vent panel 46 remains intact, preventing electrolyte leakage while being available to vent internal cell pressure if necessary.

Figure 11:
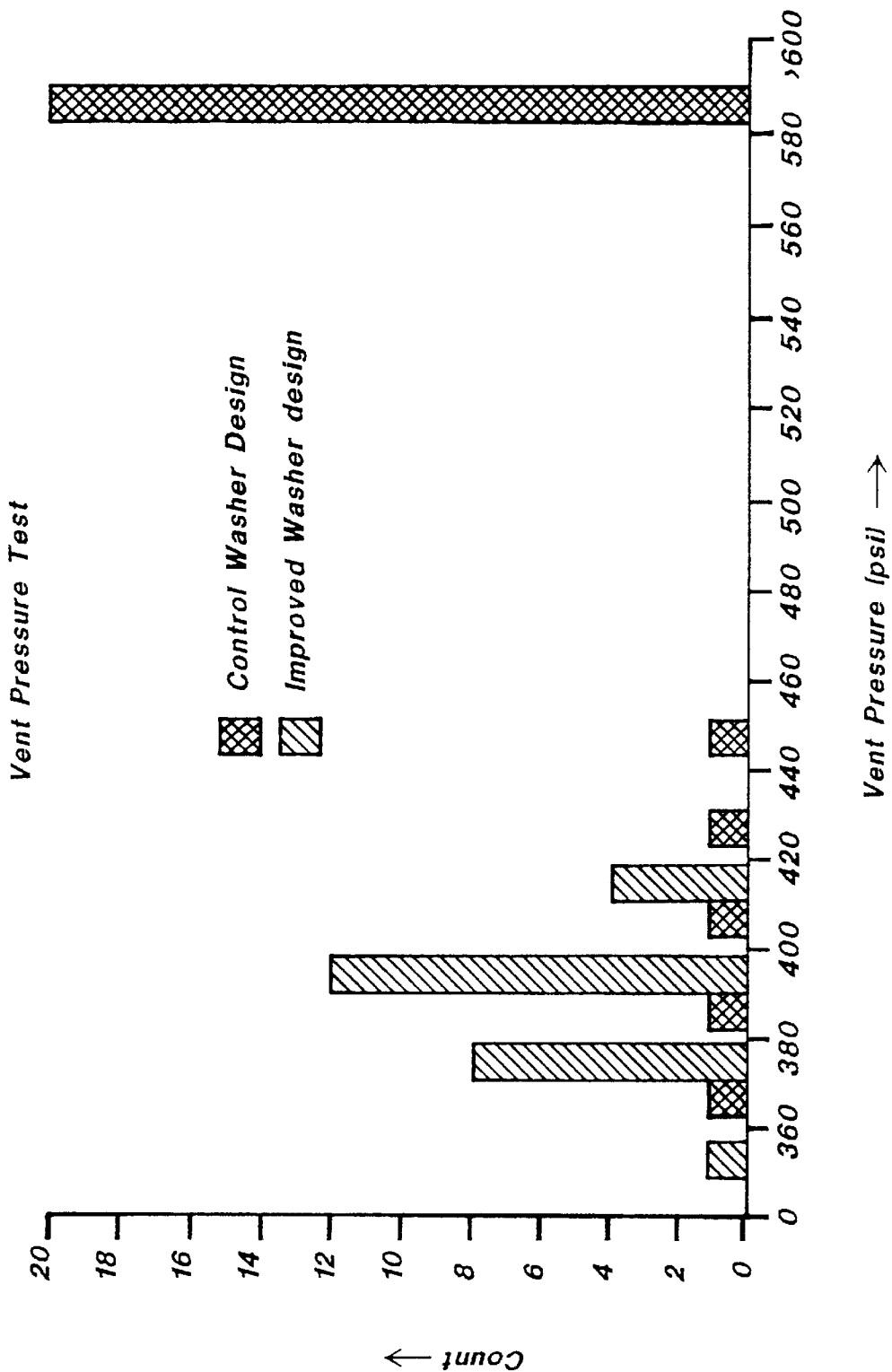
FIG. 11 is a bar chart showing comparative pressures at which seal bodies ruptured in anode assemblies.

FIG. 11 further illustrates the unexpected benefits obtained using washers of the invention. As mentioned above, it is critical that vent panels 46 rupture when the pressure in the cell reaches a predetermined value. Speaking generally to standard "D-size" cells, the vent panels should rupture at pressures of 280 to 440 pounds per square inch gauge (psig). Cells of the invention (FIG. 3 series) were subjected to pressure testing, along with control cells which used washers of the FIG. 2 series. Twenty five cells each were tested for the control structure and the invention structure. Except for the washer design, and the minor differences in the design of hub 44, comparing e.g. FIGS. 2(b) and 3(b), the cells were identical. Table 3 shows the number of cells rupturing at each pressure level tested. FIG. 11 shows the same results as a bar chart. Table 3 follows immediately hereafter.

TABLE 3

| Burst Pressure, psig | Number of Washers Having Ruptured Vent Panels | |
|---|---|---|
| | Control | Invention |
| 360 | | 1 |
| 380 | 1 | 8 |
| 400 | 1 | 12 |
| 420 | 1 | 4 |
| 440 | 1 | |
| 460 | 1 | |
| 480 | | |
| 500 | | |
| 520 | | |
| 540 | | |
| 560 | | |
| 580 | | |
| >600 | 20 | |
| Total No. of Cells Tested | 25 | 25 |

As shown in Table 3 and FIG. 11, the vent panels in the cells of the invention all ruptured within the desired range whereas the vent panels in only 5 of the control cells ruptured in the desired range. The remainder of the cells did not rupture at pressures up to 600 psig. Thus, for the control cells, only 20% of the vent panels functioned properly. It is entirely unexpected that modifying the washer 20 as done in the invention would improve proper activating of the vent panels 46.

The particular embodiments of the invention shown and described in this description relate to anode current collector assemblies and methods for making them, wherein the current collector assemblies have robust resistance to external impact forces in combination with few piece parts and corresponding economical assembly. Those of ordinary skill in the art will recognize immediately that the present invention includes, within its scope, current collector assemblies and corresponding methods of making and using them for a wide variety of primary and rechargeable electrochemical cells. For example, the invention may be used in any dry cell characterized by having any known electrochemical system.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

It is noted herein that shank 76 of current collector 12 can be somewhat smaller in cross-section than the aperture 26 in hub 44. In such embodiments, glue or other bonding or adhesive material can be used to secure the shank to sidewall 28. Accordingly, in such embodiments, the outer wall of shank 76 may not directly engage the sidewall 28 of the aperture.

Further, while the shank 76 has been illustrated as rod-shaped, the shank can accommodate a variety of shapes at its outer surface, including for example serpentine shape, screw threads, and flat sided cross-sections.

Hub 44 has been illustrated as having a seat 62 receiving the inner edge of washer 20 adjacent aperture 84. In other embodiments, hub 44 can have a groove in a side wall of the hub, as illustrated under the head of rivet 22 in prior art FIG. 1(*b*), receiving edge 86 of aperture 84. The inner edge and aperture 84 are, of course, sized accordingly to fit into such groove.

As seen above, prior art current collector assemblies relied on the bottom plate to absorb inwardly-directed impact forces. By contrast, current collectors of the invention rely primarily on the washer 20 to absorb such forces. The improved washer is more rigid, harder, and more sculptured than prior art washers. Because of the design features of washer 20 of the invention and close proximity of the plateau to bottom plate 24, the washer 20 gives support to the bottom plate after less deflection of the bottom plate, and provides a stiffer and less deflectable resistance than the softer and less rigid washers of the prior art.

As used herein and in the claims following, phrases referring to the washer "supporting the bottom plate" against inwardly-directed force include the washer being in contact with the bottom plate, and all spacings of the washer from the bottom plate wherein the washer provides primary support against inwardly imposed impact forces. Typically, such primary support is sufficient that the vent panel is not ruptured by a single 3-foot drop test of a 3-cell flashlight, and premature leakage of electrolyte by failure of a vent panel or other element of the seal body, is avoided or attenuated.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A current collector assembly for closing and sealing a cup-shaped container having electrochemically active materials therein, for thereby forming an electrochemical cell, and for collecting current from such electrochemically active materials contained therein, said current collector assembly comprising:

(a) a resilient and electrically non-conductive seal body having an opening therethrough, and a vent panel;

(b) a current collector subassembly including (i) a current collector inserted through the opening in the seal body and for insertion into one of such electrochemically active materials, and (ii) a bottom plate for closing such cell at the cup-shaped container and for providing a portion of the outer surface of such cell, said current collector providing electrical continuity between such electrochemically active material and the outer surface of such cell at said bottom plate; and (c) a structurally reinforcing washer between said seal body and said bottom plate, said washer comprising a rigid metal disk having a structurally reinforcing shape providing sufficient strength to protect said bottom plate against inwardly-directed force imposed on said bottom plate that such electrochemical cell, into which said current collector assembly is assembled, when installed into a flashlight, can routinely survive a 3-foot drop test of such flashlight without rupture of said vent panel.

2. A current collector assembly as in claim 1 wherein said washer provides primary structural support protecting said current collector assembly against inwardly-directed impact forces.

3. A current collector assembly as in claim 1 wherein the structurally reinforcing shape of said washer is spaced no more than about 0.018 inch from said bottom plate.

4. A current collector assembly as in claim 1 wherein the structurally reinforcing shape of said washer is spaced no more than about 0.015 inch from said bottom plate.

5. A current collector assembly as in claim 1 wherein the structurally reinforcing shape of said washer is spaced between about 0.003 inch and about 0.012 inch from said bottom plate.

6. A current collector assembly as in claim 1 wherein the structurally reinforcing shape of said washer is spaced between about 0.006 inch and about 0.012 inch from said bottom plate.

7. A current collector assembly as in claim 1, said structurally reinforcing shape of said washer comprising upstanding arcuate segments thereof providing structural reinforcement and bending resistance derived from said arcuate segments.

8. A current collector assembly as in claim 1, said washer having a central aperture, said structurally reinforcing shape comprising a plateau extending effectively about the aperture in a curvilinear pattern, and having upstanding, radially arcuate segments thereof disposed adjacent said aperture, said upstanding arcuate segments providing structural reinforcement and bending resistance derived from said arcuate segments.

9. A current collector assembly as in claim 1, said washer protecting a vent panel in said seal body against being prematurely activated by inwardly-directed impact force applied at said bottom plate.

10. An electrochemical cell made with a current collector assembly as in claim 1.

11. An electrochemical cell made with a current collector assembly as in claim 2.

12. An electrochemical cell made with a current collector assembly as in claim 3.

13. An electrochemical cell made with a current collector assembly as in claim 5.

14. An electrochemical cell made with a current collector assembly as in claim 6.

15. An electrochemical cell made with a current collector assembly as in claim 7.

16. An electrochemical cell made with a current collector assembly as in claim 9.

17. A current collector assembly for closing and sealing a cup-shaped container having electrochemically active materials therein, for thereby forming an electrochemical cell, and for collecting current from such electrochemically active materials contained therein, said current collector assembly comprising:
   (a) a resilient and electrically non-conductive seal body having an opening therethrough;
   (b) a current collector subassembly including (i) a current collector inserted through the opening in the seal body and for insertion into one of such electrochemically active materials, and (ii) a bottom plate for closing such cell at the cup-shaped container and for providing a portion of the outer surface of such cell, said current collector providing electrical continuity between such electrochemically active material and an outer surface of such cell at said bottom plate; and
   (c) a washer between said seal body and said bottom plate, said washer comprising a rigid disk having a central aperture and an outer perimeter, and a structurally reinforcing shape comprising a circumferentially inclined upstanding segment extending upwardly between said central aperture and said outer perimeter, said inclined upstanding segment providing structural strength to protect said bottom plate against inwardly-directed force, thereby shielding said current collector from the effect of such inwardly-directed force.

18. A current collector assembly as in claim 17, said washer providing physical support to said bottom plate effective to reinforce said bottom plate against impact forces directed against said outer surface of the cell at said bottom plate, thereby to protect said seal body against rupture.

19. A current collector assembly as in claim 17 wherein said seal body comprises a vent panel and said washer provides structural support protecting said seal body against the effect of a force directed inwardly against said bottom plate.

20. A current collector assembly as in claim 17 wherein said washer is spaced no more than about 0.018 inch from said bottom plate.

21. A current collector assembly as in claim 17 wherein said washer is spaced between about 0.003 inch and about 0.012 inch from said bottom plate.

22. A current collector assembly as in claim 17, said seal body including a vent panel, said upstanding segments providing such structural reinforcement and bending resistance to said washer that an electrochemical cell, into which said current collector assembly is assembled, when installed into a flashlight, can routinely survive a 3-foot drop test of such flashlight without rupture of said vent panel.

23. A current collector assembly as in claim 17, said washer protecting a vent panel in said seal body against being prematurely activated by inwardly-directed impact force applied at said bottom plate.

24. An electrochemical cell made with a current collector assembly as in claim 19.

25. An electrochemical cell made with a current collector assembly as in claim 20.

26. An electrochemical cell made with a current collector assembly as in claim 21.

27. An electrochemical cell made with a current collector assembly as in claim 22.

28. An electrochemical cell made with a current collector assembly as in claim 23.

29. A current collector assembly for closing and sealing a cup-shaped container having electrochemically active materials therein, for thereby forming an electrochemical cell, and for collecting current from such electrochemically active materials contained therein, said current collector assembly comprising:
   (a) a resilient and electrically non-conductive seal body having an opening therethrough, and a closed and sealed vent panel for venting gaseous pressure at a predetermined pressure level;
   (b) a current collector subassembly including (i) a current collector inserted through the opening in the seal body and for insertion into one of such electrochemically active materials, and (ii) a bottom plate for closing such cell at the cup-shaped container and for providing a portion of the outer surface of such cell, said current collector providing electrical continuity between such electrochemically active material and an outer surface of such cell at said bottom plate; and
   (c) a washer between said seal body and said bottom plate, said washer comprising a rigid disk having a central aperture and an outer perimeter, and a structurally reinforcing shape comprising an upstanding segment extending upwardly about said washer between said central aperture and said outer perimeter, said segment providing structural support to protect said bottom plate against inwardly-directed force, thereby protecting said vent panel of said seal body against premature rupture in response to an inwardly directed force imposed against said bottom plate.

30. A current collector assembly as in claim 29 wherein said washer provides structural support protecting said seal body against the effect of force directed inwardly against said bottom plate.

31. A current collector assembly as in claim 29 wherein said washer is spaced no more than about 0.018 inch from said bottom plate.

32. A current collector assembly as in claim 29 wherein said washer is spaced between about 0.003 inch and about 0.012 inch from said bottom plate.

33. A current collector assembly as in claim 29, said washer having upstanding arcuate segments thereof providing structural reinforcement and bending resistance derived from said arcuate segments.

34. An electrochemical cell made with a current collector assembly as in claim 30.

35. An electrochemical cell made with a current collector assembly as in claim 31.

36. An electrochemical cell made with a current collector assembly as in claim 32.

37. An electrochemical cell made with a current collector assembly as in claim 33.

38. A current collector assembly for closing and sealing a cup-shaped container having electrochemically active materials therein, for thereby forming an electrochemical cell, and for collecting current from such electrochemically active materials contained therein, said current collector assembly consisting essentially of:
   (a) a resilient and electrically non-conductive seal body defining an opening therethrough;
   (b) a current collector subassembly including (i) a current collector inserted through the opening in the seal body and for insertion into one of such electrochemically active materials, and (ii) a bottom plate for closing such cell at the cup-shaped container and for providing a portion of the outer surface of such cell, said current collector providing electrical continuity between such electrochemically active material and an outer surface of such cell at said bottom plate; and (c) a structurally reinforcing washer between said seal body and said bottom plate, said washer comprising a rigid disk having a central aperture and an outer perimeter, and a structurally reinforcing shape comprising an upstanding segment extending upwardly between said central aperture and said outer perimeter, thereby positioning an upper portion of said washer no more than about 0.03 inch from said bottom plate, said upstanding segment and said upper portion thereby supporting said bottom plate against inwardly-directed force, and thus shielding said current collector from the effect of such inwardly-directed force.

39. A current collector assembly as in claim 38 wherein said washer is spaced from said bottom plate a distance of between about 0.003 inch and about 0.024 inch.

40. A current collector assembly as in claim 38, said upstanding segment of said washer providing structural support protecting said seal body against the effect of force directed inwardly against said bottom plate.

41. A current collector assembly as in claim 38 wherein said washer is spaced no more than about 0.018 inch from said bottom plate.

42. A current collector assembly as in claim 38 wherein said washer is spaced between about 0.003 inch and about 0.012 inch from said bottom plate.

43. A current collector assembly as in claim 38, said upstanding segment of said washer providing such structural reinforcement and bending resistance to said washer that an electrochemical cell, into which said current collector assembly is assembled, when installed into a flashlight, can routinely survive a 3-foot drop test of such flashlight without rupture of said vent panel.

44. A current collector assembly as in claim 38, said washer having a central aperture, a plateau extending effectively about the aperture in a curvilinear pattern, and having upstanding, radially arcuate segments thereof disposed adjacent said aperture, said upstanding arcuate segments providing structural reinforcement and bending resistance derived from said arcuate segments.

45. A current collector assembly as in claim 38, said washer protecting a vent panel in said seal body against being prematurely activated by inwardly-directed impact force applied at said bottom plate.

46. An electrochemical cell made with a current collector assembly as in claim 40.

47. An electrochemical cell made with a current collector assembly as in claim 41.

48. An electrochemical cell made with a current collector assembly as in claim 42.

49. An electrochemical cell made with a current collector assembly as in claim 43.

50. An electrochemical cell made with a current collector assembly as in claim 44.

51. An electrochemical cell made with a current collector assembly as in claim 45.

52. An electrochemical cell, comprising:

(a) an anode including an anode current collector assembly comprising a structurally reinforcing washer having a central axis, said washer being positioned between a resilient seal member and a bottom plate member, the resilient seal member having a central hub and an outer perimeter portion, the bottom plate member closing an open-ended container defining containment for the electrochemical cell, said washer comprising a rigid metal disk including an inner ring portion having a central aperture engaging the central hub of the seal member, an intermediate portion having a structurally reinforcing upwardly-disposed plateau reinforcing the bottom plate member against an impact force, and a downwardly-disposed outer ring portion engaging the outer perimeter portion of the seal member;

(b) a cathode; and (c) electrochemically active material in said electrochemical cell.

53. An electrochemical cell as in claim 52 wherein the inner ring portion has a first surface in a first plane perpendicular to the central axis, and the structurally reinforcing shape has a second surface defining a plateau formed in the rigid metal disk adjacent the inner ring portion and spaced from and substantially surrounding the central aperture, the second surface being in a second plane parallel to and axially offset from the first plane, the outer ring having a third surface in a third plane parallel to and axially offset from the second surface.

54. An electrochemical cell as in claim 53, said plateau further comprising an inner ridge and an outer ridge adjacent the second plane such that the plateau has an inverted substantially U-shaped cross-section.

55. An electrochemical cell as in claim 54 wherein the second plane is axially offset from the first plane in a first axial direction and the third plane is axially offset from the first plane in a second opposite axial direction.

56. An electrochemical cell as in claim 55 wherein the plateau is offset a first axial distance from the first plane and the outer ring portion of the washer is offset a second axial distance from the first plane.

57. An electrochemical cell as in claim 54 wherein the rigid metal disk is constructed of a metal having a temper hardness number of less than 4.

58. An electrochemical cell as in claim 52 wherein a top surface of the plateau of said washer is spaced no more than about 0.018 inch from said bottom plate in the container forming the electrochemical cell.

59. An electrochemical cell as in claim 52 wherein the top surface of the plateau is initially positioned within the container forming the electrochemical cell adjacent a corresponding surface of the bottom plate.

60. An electrochemical cell as in claim 52 wherein the top surface of the plateau is initially positioned within the container forming the electrochemical cell abutting a corresponding surface of the bottom plate.

61. An electrochemical cell as in claim 54 wherein the inner and outer ridges have radially arcuate segments providing structural reinforcement and bending resistance.

\* \* \* \* \*